US008957905B2

(12) United States Patent
Reeves et al.

(10) Patent No.: US 8,957,905 B2
(45) Date of Patent: *Feb. 17, 2015

(54) CROSS-ENVIRONMENT USER INTERFACE MIRRORING

(75) Inventors: Brian Reeves, Hamilton (CA); Paul E. Reeves, Oakville (CA); Richard Teltz, Hamilton (CA); David Reeves, Ancaster (CA); Sanjiv Sirpal, Oakville (CA); Chris Tyghe, Oakville (CA); Octavian Chincisan, Richmond Hill (CA)

(73) Assignee: Z124, George Town (KY)

( * ) Notice: Subject to any disclaimer, the term of this patent is extended or adjusted under 35 U.S.C. 154(b) by 69 days.

This patent is subject to a terminal disclaimer.

(21) Appl. No.: 13/247,170

(22) Filed: Sep. 28, 2011

(65) Prior Publication Data

US 2012/0081380 A1    Apr. 5, 2012

Related U.S. Application Data

(60) Provisional application No. 61/389,117, filed on Oct. 1, 2010, provisional application No. 61/507,199, filed on Jul. 13, 2011, provisional application No. 61/507,201, filed on Jul. 13, 2011, provisional (Continued)

(51) Int. Cl.
G06F 15/167 (2006.01)
H04L 29/08 (2006.01)
G06F 9/455 (2006.01)

(52) U.S. Cl.
CPC ........ H04L 67/1095 (2013.01); G06F 9/45537 (2013.01)
USPC ............................ 345/541; 345/545; 719/319

(58) Field of Classification Search
None
See application file for complete search history.

(56) References Cited

U.S. PATENT DOCUMENTS

| 5,396,630 A | 3/1995 | Banda et al. |
| 5,673,403 A | 9/1997 | Brown et al. |

(Continued)

FOREIGN PATENT DOCUMENTS

| JP | 7219903 | 8/1995 |
| JP | 08115144 | 5/1996 |

(Continued)

OTHER PUBLICATIONS

Dutko "An introduction to the new google mobile Linux framework, android", Linux Journal, Article No. 16, vol. 2008 Issue 167, Mar. 2008.*

(Continued)

Primary Examiner — Tize Ma
Assistant Examiner — Yu Chen
(74) Attorney, Agent, or Firm — Sheridan Ross P.C.

(57) ABSTRACT

A mobile computing device with a mobile operating system and desktop operating system running concurrently and independently on a shared kernel without virtualization. The mobile operating system provides a user experience for the mobile computing device that suits the mobile environment. The desktop operating system provides a full desktop user experience when the mobile computing device is docked to a second user environment. Cross-environment rendering and user interaction support provide a seamless computing experience in a multi-operating system computing environment. The seamless computing experience includes mirroring the active user interaction space of the mobile operating system to a display of a user environment associated with the desktop operating system. The mobile computing device may be a smartphone running the Android mobile operating system and a full desktop Linux distribution on a modified Android kernel.

22 Claims, 24 Drawing Sheets

Related U.S. Application Data application No. 61/507,203, filed on Jul. 13, 2011, provisional application No. 61/507,206, filed on Jul. 13, 2011, provisional application No. 61/507,209, filed on Jul. 13, 2011.

(56) References Cited

U.S. PATENT DOCUMENTS

| | | |
|---|---|---|
| 5,764,984 A | 6/1998 | Loucks |
| 5,874,928 A | 2/1999 | Kou |
| 6,108,715 A | 8/2000 | Leach et al. |
| 6,157,959 A | 12/2000 | Bonham et al. |
| 6,178,503 B1 | 1/2001 | Madden et al. |
| 6,182,158 B1 | 1/2001 | Kougiouris et al. |
| 6,260,075 B1 | 7/2001 | Cabrero et al. |
| 6,486,890 B1 | 11/2002 | Harada et al. |
| 6,507,336 B1 | 1/2003 | Lunsford |
| 6,694,368 B1 | 2/2004 | An et al. |
| 6,826,703 B2 | 11/2004 | Kawano et al. |
| 6,927,908 B2 | 8/2005 | Stark |
| 6,961,941 B1 | 11/2005 | Nelson et al. |
| 6,970,173 B2 | 11/2005 | Ciolac |
| 7,007,240 B1 | 2/2006 | Anderson et al. |
| 7,069,519 B1 | 6/2006 | Okude et al. |
| 7,127,723 B2 | 10/2006 | Endo et al. |
| 7,284,203 B1 | 10/2007 | Meeks et al. |
| 7,453,465 B2 | 11/2008 | Schmieder et al. |
| 7,478,341 B2 | 1/2009 | Dove |
| 7,489,503 B2 | 2/2009 | Maatta |
| 7,565,535 B2 | 7/2009 | Roberts et al. |
| 7,681,134 B1 * | 3/2010 | Grechishkin et al. ......... 715/740 |
| 7,705,799 B2 | 4/2010 | Niwa |
| 7,880,728 B2 | 2/2011 | de los Reyes et al. |
| 7,949,633 B1 | 5/2011 | Shaver et al. |
| 7,950,008 B2 | 5/2011 | Bhide et al. |
| 7,960,945 B1 | 6/2011 | Onorato et al. |
| 8,397,245 B2 | 3/2013 | Filali-Adib et al. |
| 2002/0010844 A1 | 1/2002 | Noel et al. |
| 2002/0130888 A1 | 9/2002 | Perry et al. |
| 2002/0157001 A1 | 10/2002 | Huang et al. |
| 2002/0158811 A1 | 10/2002 | Davis |
| 2003/0001848 A1 | 1/2003 | Doyle et al. |
| 2003/0020954 A1 | 1/2003 | Udom et al. |
| 2003/0079010 A1 | 4/2003 | Osborn |
| 2003/0079205 A1 | 4/2003 | Miyao et al. |
| 2003/0115443 A1 | 6/2003 | Cepulis et al. |
| 2003/0174172 A1 | 9/2003 | Conrad et al. |
| 2003/0177285 A1 | 9/2003 | Hunt et al. |
| 2003/0179541 A1 | 9/2003 | Sullivan |
| 2003/0226116 A1 | 12/2003 | Kuwata et al. |
| 2004/0137855 A1 | 7/2004 | Wiley et al. |
| 2004/0141085 A1 | 7/2004 | Nickel et al. |
| 2004/0226023 A1 | 11/2004 | Tucker |
| 2005/0083642 A1 | 4/2005 | Senpuku et al. |
| 2005/0193267 A1 | 9/2005 | Liu et al. |
| 2005/0237587 A1 | 10/2005 | Nakamura |
| 2005/0246505 A1 | 11/2005 | McKenney et al. |
| 2005/0248501 A1 | 11/2005 | Kim |
| 2006/0005187 A1 | 1/2006 | Neil |
| 2006/0010314 A1 | 1/2006 | Xu |
| 2006/0031572 A1 | 2/2006 | Feuerstein et al. |
| 2006/0107020 A1 | 5/2006 | Stillwell, Jr. et al. |
| 2006/0136828 A1 | 6/2006 | Asano |
| 2006/0183505 A1 | 8/2006 | Willrich |
| 2006/0187142 A1 | 8/2006 | Lesniak |
| 2006/0227806 A1 | 10/2006 | Tseng |
| 2007/0005661 A1 | 1/2007 | Yang |
| 2007/0014295 A1 | 1/2007 | Fernandes et al. |
| 2007/0022155 A1 | 1/2007 | Owens et al. |
| 2007/0033260 A1 | 2/2007 | Grouzdev et al. |
| 2007/0067769 A1 | 3/2007 | Geisinger |
| 2007/0111750 A1 | 5/2007 | Stohr et al. |
| 2007/0136356 A1 | 6/2007 | Smith et al. |
| 2007/0156729 A1 | 7/2007 | Shaylor |
| 2007/0182663 A1 | 8/2007 | Biech |
| 2007/0198760 A1 | 8/2007 | Han |
| 2007/0271522 A1 | 11/2007 | Son et al. |
| 2007/0288941 A1 | 12/2007 | Dunshea et al. |
| 2008/0024388 A1 | 1/2008 | Bruce |
| 2008/0057910 A1 | 3/2008 | Thoresson et al. |
| 2008/0062625 A1 | 3/2008 | Batio |
| 2008/0082815 A1 | 4/2008 | Kawano et al. |
| 2008/0090525 A1 | 4/2008 | Joo |
| 2008/0119237 A1 | 5/2008 | Kim |
| 2008/0119731 A1 | 5/2008 | Becerra et al. |
| 2008/0126762 A1 | 5/2008 | Kelley et al. |
| 2008/0134061 A1 | 6/2008 | Banerjee et al. |
| 2008/0155103 A1 | 6/2008 | Bailey |
| 2008/0244599 A1 | 10/2008 | Hodson et al. |
| 2008/0291283 A1 | 11/2008 | Achiwa et al. |
| 2008/0299951 A1 | 12/2008 | Karkanias et al. |
| 2009/0037649 A1 | 2/2009 | Xu |
| 2009/0055749 A1 | 2/2009 | Chatterjee et al. |
| 2009/0083829 A1 * | 3/2009 | Peterson ............................ 726/1 |
| 2009/0089569 A1 | 4/2009 | Baribault et al. |
| 2009/0100429 A1 | 4/2009 | Thoelke et al. |
| 2009/0109468 A1 | 4/2009 | Barclay et al. |
| 2009/0119580 A1 | 5/2009 | Rohrabaugh et al. |
| 2009/0158299 A1 | 6/2009 | Carter |
| 2009/0164930 A1 | 6/2009 | Chen et al. |
| 2009/0217071 A1 | 8/2009 | Huang et al. |
| 2009/0219254 A1 | 9/2009 | Lai et al. |
| 2009/0249247 A1 | 10/2009 | Tseng et al. |
| 2009/0249331 A1 | 10/2009 | Davis et al. |
| 2009/0257657 A1 | 10/2009 | Temmermans et al. |
| 2009/0305743 A1 | 12/2009 | Gouesbet et al. |
| 2009/0313440 A1 | 12/2009 | Kim et al. |
| 2009/0327560 A1 | 12/2009 | Yalovsky |
| 2010/0005396 A1 | 1/2010 | Nason et al. |
| 2010/0013863 A1 | 1/2010 | Harris |
| 2010/0046026 A1 | 2/2010 | Heo |
| 2010/0060549 A1 | 3/2010 | Tsern |
| 2010/0063994 A1 | 3/2010 | Cook et al. |
| 2010/0064228 A1 | 3/2010 | Tsern |
| 2010/0064244 A1 | 3/2010 | Kilpatrick et al. |
| 2010/0064536 A1 | 3/2010 | Caskey et al. |
| 2010/0066763 A1 | 3/2010 | Macdougall et al. |
| 2010/0079355 A1 | 4/2010 | Kilpatrick, II et al. |
| 2010/0085274 A1 | 4/2010 | Kilpatrick et al. |
| 2010/0085301 A1 | 4/2010 | Cohen et al. |
| 2010/0085382 A1 | 4/2010 | Lundqvist et al. |
| 2010/0097386 A1 | 4/2010 | Kim et al. |
| 2010/0107163 A1 | 4/2010 | Lee |
| 2010/0122271 A1 | 5/2010 | Labour et al. |
| 2010/0157518 A1 | 6/2010 | Ladouceur et al. |
| 2010/0177019 A1 | 7/2010 | Jeong et al. |
| 2010/0177047 A1 | 7/2010 | Brenneman et al. |
| 2010/0211769 A1 | 8/2010 | Shankar et al. |
| 2010/0246119 A1 | 9/2010 | Collopy et al. |
| 2010/0250975 A1 | 9/2010 | Gill et al. |
| 2010/0251233 A1 | 9/2010 | Majewski et al. |
| 2010/0319008 A1 | 12/2010 | Ho |
| 2010/0321275 A1 | 12/2010 | Hinckley et al. |
| 2011/0016299 A1 * | 1/2011 | Galicia et al. ..................... 713/1 |
| 2011/0016301 A1 | 1/2011 | Galicia et al. |
| 2011/0025625 A1 | 2/2011 | Hirako |
| 2011/0034214 A1 | 2/2011 | Hong et al. |
| 2011/0063192 A1 | 3/2011 | Miller et al. |
| 2011/0093691 A1 * | 4/2011 | Galicia et al. ..................... 713/2 |
| 2011/0093836 A1 | 4/2011 | Galicia et al. |
| 2011/0102314 A1 | 5/2011 | Roux |
| 2011/0113329 A1 | 5/2011 | Pusateri |
| 2011/0115737 A1 | 5/2011 | Fuyuno et al. |
| 2011/0126216 A1 | 5/2011 | Galicia et al. |
| 2011/0167492 A1 | 7/2011 | Ghosh et al. |
| 2011/0209102 A1 | 8/2011 | Hinckley et al. |
| 2011/0210922 A1 | 9/2011 | Griffin |
| 2011/0216064 A1 | 9/2011 | Dahl et al. |
| 2011/0225538 A1 | 9/2011 | Oyagi et al. |
| 2011/0239142 A1 | 9/2011 | Steeves et al. |
| 2011/0246904 A1 | 10/2011 | Pinto et al. |
| 2011/0260997 A1 | 10/2011 | Ozaki |
| 2011/0267478 A1 | 11/2011 | Jacobs |
| 2011/0273464 A1 | 11/2011 | Brunner et al. |

(56) References Cited

U.S. PATENT DOCUMENTS

| | | | |
|---|---|---|---|
| 2011/0273475 A1 | 11/2011 | Herz et al. |
| 2011/0289444 A1 | 11/2011 | Winsky |
| 2011/0291964 A1 | 12/2011 | Chambers et al. |
| 2011/0312349 A1 | 12/2011 | Forutanpour |
| 2012/0005602 A1 | 1/2012 | Anttila et al. |
| 2012/0005691 A1 | 1/2012 | Wong et al. |
| 2012/0026069 A1 | 2/2012 | Ohsaki |
| 2012/0060089 A1 | 3/2012 | Heo et al. |
| 2012/0076197 A1 | 3/2012 | Byford et al. |
| 2012/0081278 A1 | 4/2012 | Freedman |
| 2012/0081353 A1 | 4/2012 | Yusupov et al. |
| 2012/0081383 A1 | 4/2012 | Reeves et al. |
| 2012/0084480 A1 | 4/2012 | Reeves et al. |
| 2012/0084481 A1 | 4/2012 | Reeves et al. |
| 2012/0084542 A1 | 4/2012 | Reeves et al. |
| 2012/0084675 A1 | 4/2012 | Sirpal et al. |
| 2012/0084697 A1 | 4/2012 | Reeves |
| 2012/0084791 A1 | 4/2012 | Benedek et al. |
| 2012/0084792 A1 | 4/2012 | Benedek et al. |
| 2012/0084793 A1 | 4/2012 | Reeves et al. |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089906 A1 | 4/2012 | Reeves et al. |
| 2012/0089992 A1 | 4/2012 | Reeves et al. |
| 2012/0094716 A1 | 4/2012 | Reeves |
| 2012/0172088 A1 | 7/2012 | Kirch et al. |
| 2012/0176413 A1 | 7/2012 | Kulik et al. |
| 2012/0188185 A1 | 7/2012 | Cassar |
| 2012/0278747 A1 | 11/2012 | Abraham et al. |
| 2012/0278750 A1 | 11/2012 | Abraham et al. |
| 2013/0019183 A1 | 1/2013 | Reeves et al. |
| 2013/0021262 A1 | 1/2013 | Chen |
| 2013/0024778 A1 | 1/2013 | Reeves et al. |
| 2013/0024812 A1 | 1/2013 | Reeves et al. |
| 2013/0076672 A1 | 3/2013 | Sirpal et al. |
| 2013/0076677 A1 | 3/2013 | Kretz |
| 2013/0076678 A1 | 3/2013 | Kretz |
| 2013/0076679 A1 | 3/2013 | Kretz |
| 2013/0076683 A1 | 3/2013 | Reeves |
| 2013/0079062 A1 | 3/2013 | Sirpal et al. |
| 2013/0080945 A1 | 3/2013 | Reeves |
| 2013/0088411 A1 | 4/2013 | Reeves et al. |
| 2013/0167159 A1 | 6/2013 | Ricci et al. |
| 2013/0219162 A1 | 8/2013 | Reeves et al. |
| 2013/0312106 A1 | 11/2013 | Reeves et al. |

FOREIGN PATENT DOCUMENTS

| | | |
|---|---|---|
| JP | 2008225546 | 9/2008 |
| KR | 1020020092969 | 12/2002 |
| KR | 100578592 | 5/2006 |
| KR | 1020060081997 | 7/2006 |
| KR | 100616157 | 8/2006 |
| KR | 100883208 | 2/2009 |
| KR | 1020100043434 | 4/2010 |
| WO | WO 2006/075859 | 7/2006 |
| WO | WO 2008/132924 | 11/2008 |

OTHER PUBLICATIONS

Rebecka & Zingo, Share memory using ashmem and binder in the android framework, "http://www.androidenea.com/2010/03/share-memory-using-ashmem-and-binder-in.html", Mar. 22, 2010.*
McDermott, Porting Android to a new device, "http://yidonghan.wordpress.com/2010/01/28/porting-android-to-a-new-device/", Jan. 28, 2010.*
Official Action for U.S. Appl. No. 13/251,427 mailed Feb. 15, 2013, 18 pages.
"Lapdock™ for Motorola Atrix," at http://www.motorola.com/Consumers/US-EN/Consumer-Product-and-Services/Mobile . . . , accessed Apr. 18, 2011, 1 page.
"Motorola Atrix 4G Laptop Dock Review," at http://www.phonearena.com/reviews/Motorola-ATRIX-4G-Laptop-Dock-Review_id2667, Mar. 2, 2011, 6 pages.
Burns, C., "Motorola Atrix 4G Laptop Dock Review," at http://androidcommunity.com/motorola-atrix-4g-laptop-dock-review-20110220/, Feb. 20, 2011, 5 pages.
Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.
Google images, accessed Apr. 18, 2011, 6 pages.
Harman03, "Kyocera Echo Dual-screen Android Phone," posted 4 weeks from Apr. 18, 2011, 3 pages.
Stein, S., "How does the Motorola Atrix 4G Lapdock compare with a laptop?" Crave—CNET, at http://news.cnet.com/8301-17938_105-20031251-1.html, Feb. 9, 2011, 7 pages.
Sud, et al., "Dynamic Migration of Computation Through Virtualization of the Mobile Platform," Mobile Networks and Applications, 2012, (published online Feb. 22, 2011), vol. 17, Iss. 2, pp. 206-215.
Website entitled, "Kyocera Echo," at www.echobykyocera.com/, 2011, 6 pages.
Website entitled, "Sony Tablet," at www.store.sony.com/webapp/wcs/stores/servlet/CategoryDisplay?catalogId=10551&storeId=10151&langId=-1&categoryId=8198552921644795521, 2011, 3 pages.
International Search Report for International Patent Application No. PCT/US2011/052988, mailed May 3, 2012, 5 pages.
Written Opinion for International Patent Application No. PCT/US2011/052988, mailed May 3, 2012, 4 pages.
International Search Report for International Patent Application No. PCT/US2011/053037, mailed Mar. 20, 2012, 5 pages.
Written Opinion for International Patent Application No. PCT/US2011/053037, mailed Mar. 20, 2012, 6 pages.
International Search Report for International Patent Application No. PCT/US2011/053127, mailed Apr. 24, 2012, 5 pages.
Written Opinion for International Patent Application No. PCT/US2011/053127, mailed Apr. 24, 2012, 4 pages.
International Search Report for International Patent Application No. PCT/US2011/053130, mailed Apr. 24, 2012, 5 pages.
Written Opinion for International Patent Application No. PCT/US2011/053130, mailed Apr. 24, 2012, 4 pages.
International Search Report for International Patent Application No. PCT/US2011/053665, mailed Apr. 30, 2012, 5 pages.
Written Opinion for International Patent Application No. PCT/US2011/053665, mailed Apr. 30, 2012, 4 pages.
International Search Report for International Patent Application No. PCT/US2011/053691, mailed May 4, 2012, 5 pages.
Written Opinion for International Patent Application No. PCT/US2011/053691, mailed May 4, 2012, 4 pages.
International Search Report for International Patent Application No. PCT/US2011/053826, mailed Apr. 27, 2012, 5 pages.
Written Opinion for International Patent Application No. PCT/US2011/053826, mailed Apr. 27, 2012, 4 pages.
International Search Report for International Patent Application No. PCT/US2011/053909, mailed Apr. 30, 2012, 5 pages.
Written Opinion for International Patent Application No. PCT/US2011/053909, mailed Apr. 30, 2012, 4 pages.
International Search Report for International Patent Application No. PCT/US2011/053923, mailed Apr. 30, 2012, 5 pages.
Written Opinion for International Patent Application No. PCT/US2011/053923, mailed Apr. 30, 2012, 4 pages.
International Search Report for International Patent Application No. PCT/US2011/054017, mailed Apr. 24, 2012, 5 pages.
Written Opinion for International Patent Application No. PCT/US2011/054017, mailed Apr. 24, 2012, 4 pages.
International Search Report for International Patent Application No. PCT/US2011/054019, mailed Apr. 10, 2012, 5 pages.
Written Opinion for International Patent Application No. PCT/US2011/054019, mailed Apr. 10, 2012, 4 pages.
International Search Report for International Patent Application No. PCT/US2011/054605, mailed Apr. 30, 2012, 5 pages.
Written Opinion for International Patent Application No. PCT/US2011/054605, mailed Apr. 30, 2012, 5 pages.

(56) References Cited

OTHER PUBLICATIONS

International Search Report for International Patent Application No. PCT/US2011/054623, mailed Apr. 27, 2012, 5 pages.
Written Opinion for International Patent Application No. PCT/US2011/054623, mailed Apr. 27, 2012, 4 pages.
International Search Report for International Patent Application No. PCT/US2011/056149, mailed Apr. 24, 2012, 5 pages.
Written Opinion for International Patent Application No. PCT/US2011/056149, mailed Apr. 24, 2012, 4 pages.
Official Action for U.S. Appl. No. 12/905,920 mailed Dec. 7, 2012, 13 pages.
Official Action for U.S. Appl. No. 12/905,920 mailed Jul. 3, 2012, 14 pages.
Official Action for U.S. Appl. No. 12/905,920 mailed Mar. 15, 2012, 12 pages.
Official Action for U.S. Appl. No. 13/246,669 mailed Jan. 8, 2013, 14 pages.
U.S. Appl. No. 14/068,662, filed Oct. 31, 2013, Benedek.
"Apple iPod and iPhone dock Connector Pinout," AllPinouts, Sep. 27, 2010, 3 pages [www.allpinouts.org/index/php/Apple_iPod,_iPad_and_iPhone_dock].
Google Transliteration IME website, 2010, available at www.google.com/ime/transliteration/help.html#features, 8 pages.
"How to Install Ubuntu on Your Nexus One/Android!" NexusOneHacks.net, Jul. 6, 2010, 9 pages [nexusonehacks.net/nexus-one-hacks/how-to-install-ubuntu-on-your-android].
InputKing Online Input System, 2011, available at www.inputking.com, 2 pages.
Kilpatrick et al., "Securing the X Window System with SELinux," NAI Labs Report No. 03-006, 2003, 33 pages.
Mikeclay, "Launch Multiple Programs at Once Using Simple Batch File," Feb. 5, 2009 available at www.web.archive.org/web/20090205134920/http://www.windowsreference.com/windows-2000/launch-multiple-programs-at-once-using-simple-batch-file/, 5 pages.
Sakhr Software—Arabic Optical Character Recognition, Jul. 15, 2011, available at www.sakhr.com/ocr.aspx, 1 page.
Stallman "GNU Operating System: Android and Users' Freedom," Sep. 2, 2013, 4 pages [gnu.org/philosophy/android-and-users-freedom.html].
Wikipedia, "Balloon help," Jul. 18, 2011, available at www.en.wikipedia.org/wiki/Balloon_help, 3 pages.
Wikipedia, "Google Pinyin," Aug. 27, 2011 available at www.en.wikipedia.org/wiki/Google_Pinyin, 3 pages.
Wikipedia, "Mouseover," Sep. 29, 2011, available at www.en.wikipedia.org/wiki/Mouseover, 2 pages.
Wikipedia, "Predictive text," Aug. 7, 2011, available at www.en.wikipedia.org/wiki/Predictive_test, 6 pages.
Wikipedia, "Sogou Pinyin," Jul. 23, 2011 available at www.en.wikipedia.org/wiki/Sogou_Pinyin, 3 pages.
Wikipedia, "Status bar," Sep. 8, 2011, available at www.en.wikipedia.org/wiki/Status_bar, 3 pages.
Wikipedia, "Tooltip," Sep. 17, 2011, available at www.en.wikipedia.org/wiki/Tooltip, 2 pages.
International Search Report and Written Opinion for International Patent Application No. PCT/US2012/046800, mailed Feb. 20, 2013, 9 pages.
International Search Report and Written Opinion for International Patent Application No. PCT/US2012/046802, mailed Feb. 20, 2013, 9 pages.
International Preliminary Report on Patentability for International Patent Application No. PCT/US2011/056149, mailed Apr. 25, 2013, 6 pages.
International Search Report for International Patent Application No. PCT/US11/52822, mailed Apr. 27, 2012, 5 pages.
International Preliminary Report on Patentability for International (PCT) Patent Application No. PCT/US2011/052822, mailed Apr. 11, 2013 7 pages.
International Search Report for International Patent Application No. PCT/US11/52598, mailed Mar. 27, 2012, 3 pages.
International Preliminary Report on Patentability for International (PCT) Patent Application No. PCT/US2011/052598, mailed Apr. 11, 2013 9 pages.
International Search Report for International Patent Application No. PCT/US11/53835, mailed Apr. 30, 2012, 5 pages.
Written Opinion for International Patent Application No. PCT/US11/53835, mailed Apr. 30, 2012, 4 pages.
International Preliminary Report on Patentability for International (PCT) Patent Application No. PCT/US2011/053835, mailed Apr. 11, 2013 6 pages.
International Preliminary Report on Patentability for International Patent Application No. PCT/US2011/053130, mailed Apr. 11, 2013, 6 pages.
International Preliminary Report on Patentability for International Patent Application No. PCT/US2011/053826, mailed Apr. 11, 2013, 6 pages.
International Preliminary Report on Patentability for International Patent Application No. PCT/US2011/052988, mailed Apr. 11, 2013, 6 pages.
International Preliminary Report on Patentability for International Patent Application No. PCT/US2011/054605, mailed Apr. 11, 2013, 7 pages.
International Preliminary Report on Patentability for International Patent Application No. PCT/US2011/053909, mailed Apr. 11, 2013, 6 pages.
International Preliminary Report on Patentability for International Patent Application No. PCT/US2011/054623, mailed Apr. 11, 2013, 6 pages.
International Preliminary Report on Patentability for International Patent Application No. PCT/US2011/053037, mailed Apr. 11, 2013, 8 pages.
International Preliminary Report on Patentability for International Patent Application No. PCT/US2011/053923, mailed Apr. 11, 2013, 6 pages.
International Preliminary Report on Patentability for International Patent Application No. PCT/US2011/054017, mailed Apr. 11, 2013, 6 pages.
International Search Report for International Patent Application No. PCT/US11/54105, mailed Apr. 30, 2012, 3 pages.
International Preliminary Report on Patentability for International (PCT) Patent Application No. PCT/US2011/054105, mailed Apr. 11, 2013 5 pages.
International Search Report for International Patent Application No. PCT/US11/53585, mailed May 4, 2012, 3 pages.
International Preliminary Report on Patentability for International (PCT) Patent Application No. PCT/US2011/053585, mailed Apr. 11, 2013 6 pages.
International Preliminary Report on Patentability for International Patent Application No. PCT/US2011/053665, mailed Apr. 11, 2013, 6 pages.
International Preliminary Report on Patentability for International Patent Application No. PCT/US2011/053691, mailed Apr. 11, 2013, 6 pages.
International Preliminary Report on Patentability for International Patent Application No. PCT/US2011/054019, mailed Apr. 11, 2013, 6 pages.
International Preliminary Report on Patentability for International Patent Application No. PCT/US2011/053127, mailed Apr. 11, 2013, 6 pages.
Official Action for U.S. Appl. No. 13/247,719, mailed Mar. 29, 2013 16 pages.
Official Action for U.S. Appl. No. 13/247,719, mailed Aug. 16, 2013 20 pages.
Official Action for U.S. Appl. No. 13/484,951, mailed Aug. 17, 2012, 13 pages.
Official Action for U.S. Appl. No. 13/484,951, mailed Mar. 11, 2013 11 pages.
Official Action for U.S. Appl. No. 13/484,951, mailed Jul. 25, 2013 12 pages.
Official Action for U.S. Appl. No. 13/399,901, mailed Aug. 2, 2013 17 pages.
Official Action for U.S. Appl. No. 13/399,929, mailed Dec. 3, 2013 21 pages.

(56) References Cited

OTHER PUBLICATIONS

Official Action for U.S. Appl. No. 13/399,936, mailed Sep. 10, 2013 23 pages.
Official Action for U.S. Appl. No. 12/905,920 mailed Apr. 25, 2013, 16 pages.
Official Action for U.S. Appl. No. 12/905,920, mailed Sep. 30, 2013 20 pages.
Official Action for U.S. Appl. No. 12/948,686, mailed Jul. 26, 2013 11 pages.
Official Action for U.S. Appl. No. 12/948,701, mailed Nov. 16, 2012, 16 pages.
Official Action for U.S. Appl. No. 12/948,701, mailed Jun. 7, 2013 16 pages.
Official Action for U.S. Appl. No. 13/246,665, mailed Apr. 24, 2013 30 pages.
Official Action for U.S. Appl. No. 246,665, mailed Aug. 28, 2013 33 pages.
Official Action for U.S. Appl. No. 13/217,099 mailed Apr. 10, 2013, 53 pages.
Final Action for U.S. Appl. No. 13/217,099, mailed Oct. 9, 2013 74 pages.
Official Action for U.S. Appl. No. 13/247,885 mailed Mar. 19, 2013, 19 pages.
Notice of Allowance for U.S. Appl. No. 13/247,885, mailed Aug. 29, 2013 12 pages.
Official Action for U.S. Appl. No. 13/217,108, mailed Oct. 11, 2013 13 pages.
Final Action for U.S. Appl. No. 13/251,427, mailed Oct. 21, 2013 17 pages.
Official Action for U.S. Appl. No. 13/247,166 mailed Mar. 21, 2013, 4 pages Restriction Requirement.
Official Action for U.S. Appl. No. 13/247,166, mailed Jul. 2, 2013 12 pages.
Notice of Allowance for U.S. Appl. No. 13/247,166, mailed Nov. 4, 2013 14 pages.
Official Action for U.S. Appl. No. 13/217,130 mailed Mar. 15, 2013, 12 pages.
Official Action for U.S. Appl. No. 13/217,130, mailed Sep. 16, 2013 12 pages.
Official Action for U.S. Appl. No. 13/246,699, mailed Jul. 12, 2013 18 pages.
Notice of Allowance for U.S. Appl. No. 13/246,669, mailed Sep. 11, 2013 16 pages.
Official Action for U.S. Appl. No. 13/246,671, mailed Mar. 27, 2013 34 pages.
Official Action for U.S. Appl. No. 13/246,671, mailed Jul. 15, 2013.
Official Action for U.S. Appl. No. 13/246,671, mailed Nov. 20, 2013 50 pages.
Official Action for U.S. Appl. No. 13/246,128 mailed May 10, 2013, 40 pages.
Official Action for U.S. Appl. No. 13/246,128, mailed Aug. 23, 2013 46 pages.
Official Action for U.S. Appl. No. 13/246,133 mailed Apr. 16, 2013, 25 pages.
Official Action for U.S. Appl. No. 13/246,133, mailed Aug. 23, 2013 32 pages.
Official Action for U.S. Appl. No. 13/246,675 mailed May 1, 2013, 27 pages.
Official Action for U.S. Appl. No. 13/246,675, mailed Sep. 27, 2013 32 pages.
Official Action for U.S. Appl. No. 13/217,121 mailed Mar. 6, 2013, 11 pages.
Official Action for U.S. Appl. No. 13/217,121, mailed Aug. 1, 2013 11 pages.
European Extended Search Report for European Patent Application No. 11829880.1, mailed Dec. 5, 2014, 10 pages.
Notice of Allowance for U.S. Appl. No. 14/498,330, mailed Oct. 27, 2014 8 pages.
Official Action for U.S. Appl. No. 13/628,170, mailed Nov. 3, 2014, 9 pages.
Official Action for U.S. Appl. No. 13/629,415, mailed Dec. 3, 2014, 22 pages.
Official Action for U.S. Appl. No. 13/628,949, mailed Oct. 9, 2014 11 pages.
Official Action for U.S. Appl. No. 13/399,901, mailed Oct. 29, 2014 23 pages.
Official Action for U.S. Appl. No. 13/217,099, mailed Dec. 1, 2014 82 pages.
Official Action for U.S. Appl. No. 13/251,427, mailed Dec. 8, 2014 17 pages.
Notice of Allowance for U.S. Appl. No. 13/250,764, mailed Dec. 4, 2014 8 pages.
Notice of Allowance for U.S. Appl. No. 13/217,130, mailed Dec. 3, 2014 5 pages.
Notice of Allowance for U.S. Appl. No. 13/246,671, mailed Sep. 25, 2014 9 pages.
Official Action for U.S. Appl. No. 13/246,118, mailed Oct. 8, 2014 10 pages.

* cited by examiner

CROSS-ENVIRONMENT USER INTERFACE MIRRORING

CROSS-REFERENCE TO RELATED APPLICATIONS

This Application is a non-provisional of and claims the benefit of the filing date of U.S. Provisional Application Nos. 61/389,117, filed Oct. 1, 2010, entitled "Multi-Operating System Portable Docking Device"; 61/507,199, filed Jul. 13, 2011, entitled "Dockable Mobile Software Architecture"; 61/507,201, filed Jul. 13, 2011, entitled "Cross-Environment Communication Framework"; 61/507,203, filed Jul. 13, 2011, entitled "Multi-Operating System"; 61/507,206, filed Jul. 13, 2011, entitled "Auto-Configuration of a Docked System in a Multi-OS Environment"; and 61/507,209, filed Jul. 13, 2011, entitled "Auto-Waking of a Suspended Secondary OS in a Dockable System," wherein the entire contents of the foregoing priority applications are incorporated herein by reference for all purposes.

BACKGROUND

1. Field

This Application relates generally to the field of mobile computing environments, and more particularly to supporting multiple user environments through the use of multiple operating systems in a single mobile computing device.

2. Relevant Background

Mobile computing devices are becoming ubiquitous in today's society. For example, as of the end of 2008, 90 percent of Americans had a mobile wireless device. At the same time, the capabilities of mobile devices are advancing rapidly, including smartphones that integrate advanced computing capabilities with mobile telephony capabilities. Mobile providers have launched hundreds of new smartphones in the last three years based upon several different platforms (e.g., Apple™ iPhone™, Android™, BlackBerry™, Palm™, and Windows™ Mobile). In the U.S., smartphone penetration reached almost 23% by the middle of 2010, and over 35% in some age-groups. In Europe, the smartphone market grew by 41% from 2009 to 2010, with over 60 million smartphone subscribers as of July 2010 in the five largest European countries alone.

While smartphones are gaining in popularity and computing capability, they provide a limited user experience. Specifically, they typically have an operating system that is modified for mobile device hardware and a restricted set of applications that are available for the modified operating system. For example, many smartphones run Google's™ Android™ operating system. Android runs only applications that are specifically developed to run within a Java™-based virtual machine runtime environment. In addition, while Android is based on a modified Linux™ kernel, it uses different standard C libraries, system managers, and services than Linux. Accordingly, applications written for Linux do not run on Android without modification or porting. Similarly, Apple's iPhone uses the iOS™ mobile operating system. Again, while iOS is derived from Mac OS X™, applications developed for OS X do not run on iOS. Therefore, while many applications are available for mobile operating systems such as Android and iOS, many other common applications for desktop operating systems such as Linux and Mac OS X are not available on the mobile platforms.

Accordingly, smartphones are typically suited for a limited set of user experiences and provide applications designed primarily for the mobile environment. In particular, smartphones do not provide a suitable desktop user experience, nor do they run most common desktop applications. As a result, many users carry and use multiple computing devices including a smartphone, laptop, and/or tablet computer. In this instance, each device has its own CPU, memory, file storage, and operating system.

Connectivity and file sharing between smartphones and other computing devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

SUMMARY

Embodiments of the present invention are directed to providing the mobile computing experience of a smartphone and the appropriate user experience of a secondary terminal environment in a single mobile computing device. A secondary terminal environment may be some combination of visual rendering devices (e.g., monitor or display), input devices (e.g., mouse, touch pad, touch-screen, keyboard, etc.), and other computing peripherals (e.g., HDD, optical disc drive, memory stick, camera, printer, etc.) connected to the computing device by a wired (e.g., USB, Firewire™, Thunderbolt™, etc.) or wireless (e.g., Bluetooth™, WiFi, etc.) connection. In embodiments, a mobile operating system associated with the user experience of the mobile environment and a desktop operating system associated with the user experience of the secondary terminal environment are run concurrently and independently on a shared kernel.

According to one aspect consistent with various embodiments, a method for user interface mirroring includes calculating, using a first operating system, updates to a set of surfaces of a first application compiled for and in active execution within the first operating system, rendering, using the first operating system, the set of surfaces according to the updates to generate a graphics frame, storing the graphics frame in a shared memory location accessible by both the first operating system and a second operating system running concurrently on a shared kernel, displaying the graphics frame to a first application display of the first application on a first display of a first computing environment using the first operating system, passing a file descriptor indicating the shared memory location to a console application compiled for and in active execution within the second operating system, and displaying the graphics frame from the shared memory location to a second application display of the first application on a second display of a second computing environment via the console application of the second operating system according to the file descriptor, such that the second application display is substantially identical to the first application display.

According to other aspects consistent with various embodiments, a graphics server of the second operating system may be incompatible with a graphics server of the first operating system and/or a drawing object instantiated by the first application. The first operating system may be a mobile operating system and the second operating system may be a desktop operating system. The first operating system may be an Android mobile operating system and a graphics server of the second operating system may be an X-windows graphics server.

According to other aspects consistent with various embodiments, the method may include mapping, by the console application, the file descriptor to the process space of the console application to generate a reference to the shared memory location. The method may further include accessing, by the console application, the graphics frame from the shared memory location via the reference to the shared memory location. the set of surfaces of the first application may be rendered through a first context space of an extended rendering context of the first operating system.

According to other aspects consistent with various embodiments, a mobile computing device includes a first application compiled for and in active execution within a first operating system and a graphics frame for the first application is rendered in a shared memory location by the first operating system, the shared memory location accessible by both the first operating system and a second operating system running concurrently with the first operating system on a shared kernel. The mobile computing device further includes a first application display of the first application displayed on a first display of a first computing environment using the first operating system and a console application running within the second operating system that displays the graphics frame to a second application display on a display of a second computing environment associated with the second operating system by accessing the shared memory location of the graphics frame through a file descriptor to the graphics frame passed by the first operating system. A graphics server of the second operating system may be an X-windows type graphics server and the first application may use a graphics library of the first operating system that is incompatible with the X-windows type graphics server of the second operating system. The shared memory location may be a frame buffer of the first operating system.

BRIEF DESCRIPTION OF THE DRAWINGS

Embodiments of the present invention are illustrated in referenced figures of the drawings, in which like numbers refer to like elements throughout the description of the figures.

DETAILED DESCRIPTION

Mobile telephony devices, (i.e., smartphones, handsets, mobile stations, portable communication devices, etc.) that include computing capabilities are increasing in popularity. Many of these smartphones include a mobile operating system ("OS") running on a mobile processor. While mobile processors and mobile OSs have increased the capabilities of these devices, smartphones have not tended to replace personal computer ("PC") environments (i.e., Windows, Mac OS X, Linux) such as desktop or notebook computers at least because of the limited user experience provided. In particular, the user interface device(s) found on smartphones are typically tailored to the mobile environment. For example, smartphones typically use a small thumb-style QWERTY keyboard, touch-screen display, click-wheel, and/or scroll-wheel as user interface devices. Mobile OSs, as well as applications (i.e., "Apps") developed for mobile OSs, are typically designed for the constraints of the mobile environment including a mobile processor and the user interface device(s) present on mobile devices. Therefore, many applications that have been developed for PC operating systems are not available for mobile OSs (i.e., are not compiled for and do not run on mobile OSs). In addition, for some tasks such as typing or editing documents, a full-size keyboard and large display are easier to use than the user interface components typically found on a smartphone.

Accordingly, users typically use separate computing devices for each computing experience, including a smartphone, tablet computer, laptop computer, and/or desktop computer. In this instance, each device has its own CPU, memory, file storage, and OS. Connectivity and file sharing between smartphones and other devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

Figure 1:
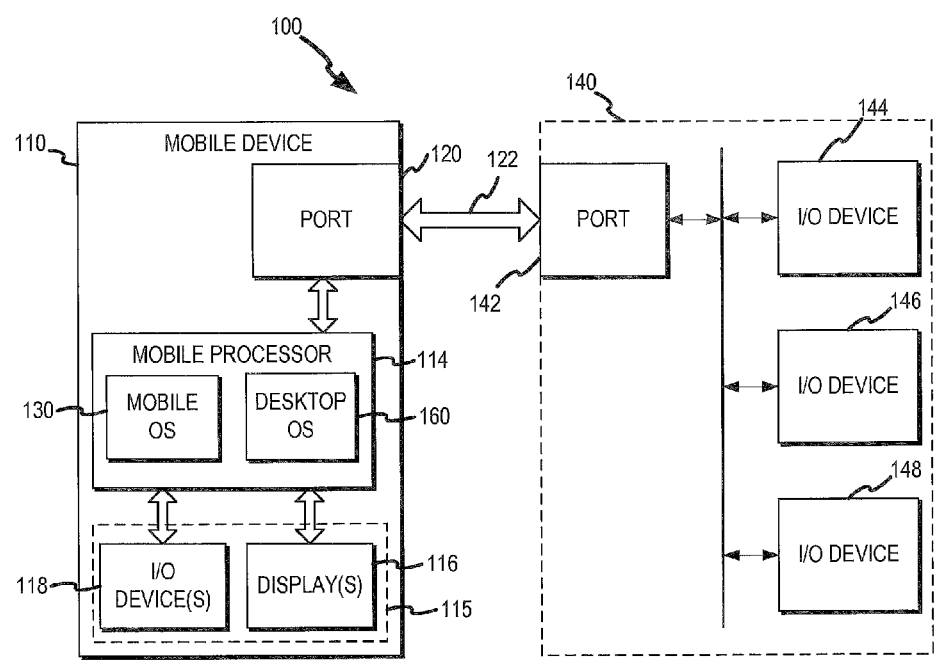
FIG. 1 illustrates a computing environment that provides multiple user computing experiences, according to various embodiments.

FIG. 1 illustrates a computing environment 100 that provides multiple user computing experiences with a mobile device that includes multiple operating systems associated with separate user interaction spaces (i.e., user environments), according to various embodiments. A first user interaction space 115 of computing environment 100 includes display(s) 116 and I/O devices 118 of mobile computing device 110. When mobile computing device 110 is operated as a stand-alone mobile device, mobile OS 130 presents a typical mobile computing user experience through user interaction space 115. The mobile computing experience provided by mobile OS 130 typically includes mobile telephony capabilities and a graphical user interface ("GUI") suited to user interaction space 115 including display(s) 116 and I/O device(s) 118. For example, display(s) 116 may be a touchscreen display(s) and application programs (i.e., "Apps") running on mobile OS 130 may be controlled primarily through a gesture-based GUI of mobile OS 130 using touch-screen display(s) 116.

In computing environment 100, mobile computing device 110 may be docked with secondary terminal environment 140 that includes I/O devices 144, 146, and/or 148. In embodiments, mobile computing device 110 is docked with secondary terminal environment 140 by connecting port 120 of mobile computing device 110 to port 142 of secondary terminal environment 140. In this instance, secondary terminal environment 140 presents a second user interaction space of computing environment 100. In some instances, the second user interaction space may be more suited to a desktop computing experience. In these instances, desktop OS 160 can be associated with secondary terminal environment 140 to provide the full capabilities of a notebook, tablet, or desktop computer environment through the second user interaction space.

In embodiments, mobile OS 130 and desktop OS 160 run concurrently on a shared kernel on a processor of mobile computing device 110. Concurrent execution of a mobile OS and a desktop OS on a shared kernel is described in more detail in U.S. patent application Ser. No. 13/217,108, filed Aug. 24, 2011, entitled "MULTI-OPERATING SYSTEM," herein incorporated by reference. In this way, a single mobile computing device can provide a mobile computing experience through a first user interaction space and a desktop computing experience through a second user interaction space. While the ability to carry one mobile device that can execute multiple operating systems concurrently through separate user interaction spaces solves a number of problems for a user, each user interaction space (through the concurrently running mobile OS and desktop OS) generally provides a separate set of available applications and user functionality.

Embodiments of the invention are directed to facilitating apparent execution of an application running in a first OS (e.g., mobile OS 130) within a second OS (e.g., desktop OS 160), where the first and second OS are running concurrently on a shared kernel. Notably, providing a user with input (e.g., input device) and output (e.g., display, audio, etc.) support in a second OS for applications compiled for and running in a first (e.g., incompatible) OS involves addressing a number of issues. Additional issues can arise when handling display and interactivity of multiple applications running concurrently.

Consider, for example, that a first and second application are both compiled for the first OS and are running concurrently on the first OS. However, a user desires to view graphical output of the first application and to interact with that first application through input/output devices associated with the first OS (e.g., using a touchscreen display of a mobile computing environment), and to view graphical output of the second application and to interact with that second application through input/output devices associated with the second OS (e.g., using a display, keyboard, and mouse of a desktop computing environment). Handling this scenario involves concurrent handling of graphics in multiple display environments and concurrent processing of multiple input/output streams for separate applications all on separate (e.g., incompatible) operating systems.

Accordingly, embodiments provide various novel techniques for accessing applications of a first OS within a user interaction space of a second OS, displaying applications running in the first OS within the user interaction space of the second OS, and handling user interaction with those applications through the user interaction space of the second OS. Embodiments include a console application of the second OS that supports various display and user interaction features of cross-environment applications.

One set of embodiments provides techniques for concurrent user interface support across multiple-OS computing environments using a so-called "non-extended" rendering context. Another set of embodiments provides techniques for concurrent user interface support across multiple-OS computing environments using a so-called "extended" rendering context. Yet another set of embodiments provides techniques for concurrent user interface support across multiple OSs using a so-called "mirrored" context. Yet another set of embodiments provides access from the user interaction space of the second OS to applications available on the first OS. Each of these sets of embodiments will be described more fully below.

As described above, computing environment 100 provides multiple user computing experiences through multiple user interaction spaces associated with a mobile device running multiple operating systems concurrently. Specifically, because mobile computing device 110 includes multiple OSs, where each OS is suited to a particular computing environment, mobile computing device 110 may be adapted with external I/O devices to provide a broad range of user experiences with a single mobile computing device. For example, a user may have a mobile computing device 110 and a secondary terminal environment 140 that includes a keyboard, display, and/or pointing device(s) in a laptop-type enclosure. When mobile computing device 110 is docked with this laptop-like secondary terminal environment, the full capabilities of desktop OS 160 are available through the secondary terminal environment 140.

Figure 2:
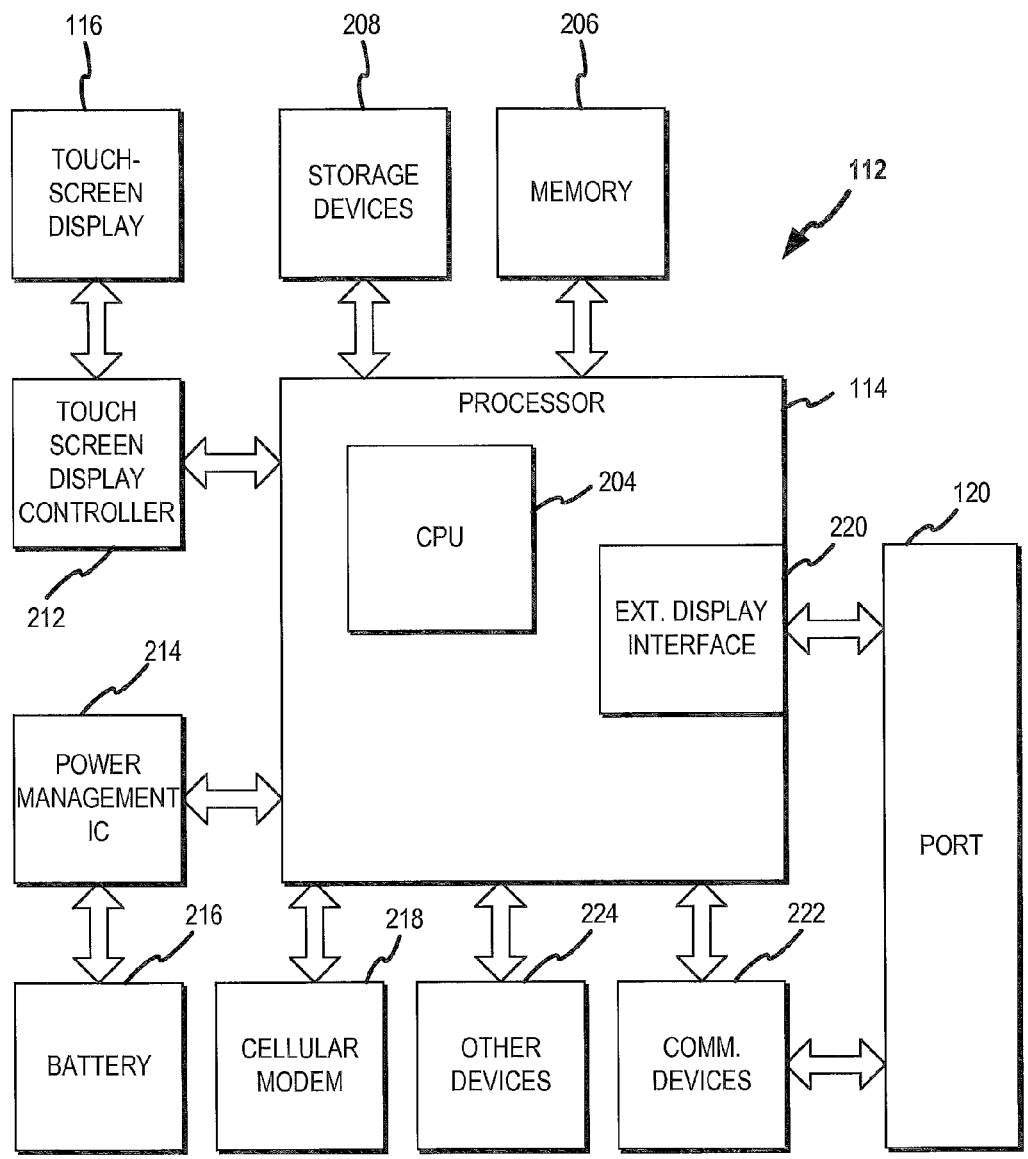
FIG. 2 illustrates an exemplary system architecture for a mobile computing device, according to various embodiments.

FIG. 2 illustrates an exemplary hardware system architecture for mobile computing device 110, according to various embodiments. Mobile computing device hardware 112 includes mobile processor 114 that includes one or more CPU cores 204 and external display interface 220. Generally, mobile computing device hardware 112 also includes I/O devices 118, memory 206, storage devices 208, touch-screen display controller 210 connected to touch-screen display 116, power management IC 214 connected to battery 216, cellular modem 218, communication devices 222, and/or other devices 224 that are connected to processor 114 through various communication signals and interfaces. I/O devices 118 generally includes buttons and other user interface components that may be employed in mobile computing device 110. For example, I/O devices 118 may include a set of buttons, (e.g., back, menu, home, search, etc.), off-screen gesture area, click-wheel, scroll-wheel, QWERTY keyboard, etc. Other devices 224 may include, for example, GPS devices, LAN connectivity, microphones, speakers, cameras, accelerometers, and/or MS/MMC/SD/SDIO card interfaces. External display interface 220 may be any suitable display interface (e.g., VGA, DVI, HDMI, etc.).

Processor 114 may be an ARM-based mobile processor. In embodiments, mobile processor 114 is a mobile ARM-based processor such as Texas Instruments™ OMAP3430, Marvell™ PXA320, Freescale™ iMX51, or Qualcomm™ QSD8650/8250. However, mobile processor 114 may be another suitable ARM-based mobile processor or processor based on other processor architectures such as, for example, x86-based processor architectures or other RISC-based processor architectures.

While FIG. 2 illustrates one exemplary hardware implementation 112 for mobile computing device 110, other architectures are contemplated as within the scope of the invention. For example, various components illustrated in FIG. 2 as external to mobile processor 114 may be integrated into mobile processor 114. Optionally, external display interface 220, shown in FIG. 2 as integrated into mobile processor 114, may be external to mobile processor 114. Additionally, other computer architectures employing a system bus, discrete graphics processor, and/or other architectural variations are suitable for employing aspects of the present invention.

Figure 3:
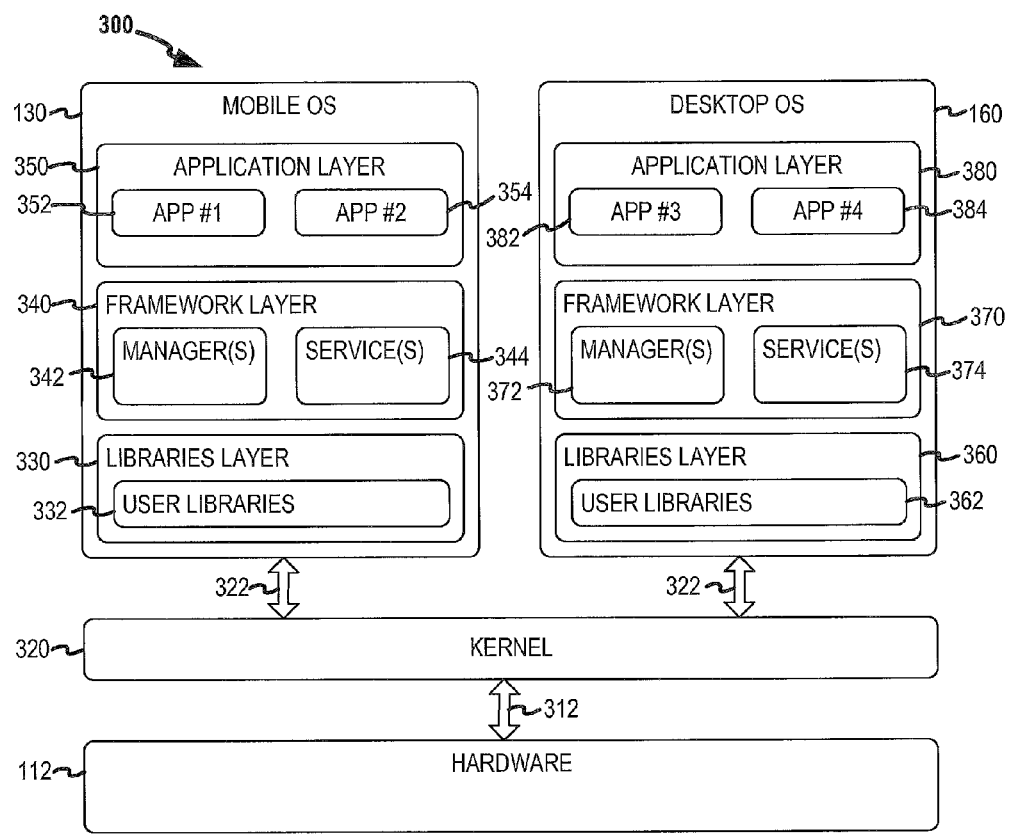
FIG. 3 illustrates an operating system architecture for a computing environment, according to various embodiments.

FIG. 3 illustrates OS architecture 300 that may be employed to run mobile OS 130 and desktop OS 160 concurrently on mobile computing device 110, according to various embodiments. As illustrated in FIG. 3, mobile OS 130 and desktop OS 160 are independent operating systems. Specifically, mobile OS 130 and desktop OS 60 may have independent and incompatible user libraries, graphics systems, and/or framework layers. Functions and instructions for OS architecture 300 may be stored as computer program code on a tangible computer readable medium of mobile computing device 110. For example, instructions for OS architecture 300 may be stored in storage device(s) 208 of mobile computing device hardware 112.

In OS architecture 300, mobile OS 130 and desktop OS 160 run concurrently on shared kernel 320. This means that mobile OS 30 and desktop OS 160 are running on shared kernel 320 at the same time. Specifically, mobile OS 130 and desktop OS 160 both interface to shared kernel 320 through the same kernel interface 322, for example, by making system calls to shared kernel 320. Shared kernel 320 manages task scheduling for processes of both mobile OS 130 and desktop OS 160. In this regard, mobile OS 30 and desktop OS 160 are running independently and concurrently on shared kernel 320. In addition, shared kernel 320 runs directly on mobile processor 114 of mobile computing device hardware 112, as illustrated by hardware interface 312. Specifically, shared kernel 320 directly manages the computing resources of mobile computing device hardware 112 such as CPU scheduling, memory access, and I/O. In this regard, hardware resources are not virtualized, meaning that mobile OS 130 and desktop OS 160 make system calls through kernel interface 322 without virtualized memory or I/O access.

As illustrated in FIG. 3, mobile OS 130 has libraries layer 330, application framework layer 340, and application layer 350. In mobile OS 130, applications 352 and 354 run in application layer 350 supported by application framework layer 340 of mobile OS 130. Application framework layer 340 includes manager(s) 342 and service(s) 344 that are used by applications running on mobile OS 130. For example, application framework layer 340 may include a window manager, activity manager, package manager, resource manager, telephony manager, gesture controller, and/or other managers and services for the mobile environment. Application framework layer 340 may include a mobile application runtime environment that executes applications developed for mobile OS 130. The mobile application runtime environment may be optimized for mobile computing resources such as lower processing power and/or limited memory space. The mobile application runtime environment may rely on the kernel for process isolation, memory management, and threading support. Libraries layer 330 includes user libraries 332 that implement common functions such as I/O and string manipulation, graphics functions, database capabilities, communication capabilities, and/or other functions and capabilities.

As illustrated in FIG. 3, desktop OS 160 has libraries layer 360, framework layer 370, and application layer 380. In desktop OS 160, applications 382 and 384 run in application layer 380 supported by application framework layer 370 of desktop OS 160. Application framework layer 370 includes manager(s) 372 and service(s) 374 that are used by applications running on desktop OS 160. For example, application framework layer 370 may include a window manager, activity manager, package manager, resource manager, and/or other managers and services common to a desktop environment. Libraries layer 360 may include user libraries 362 that implement common functions such as I/O and string manipulation, graphics functions, database capabilities, communication capabilities, and/or other functions and capabilities.

In various embodiments of the present disclosure, desktop OS 160 runs in a separate execution environment from mobile OS 130. For example, mobile OS 130 may run in a root execution environment and desktop OS 160 may run in a secondary execution environment established under the root execution environment. Processes and applications running on mobile OS 130 access user libraries 332, manager(s) 342 and service(s) 344 in the root execution environment. Processes and applications running on desktop OS 160 access user libraries 362, manager(s) 372 and service(s) 374 in the secondary execution environment.

In embodiments, mobile OS 130 and desktop 160 are independent operating systems with incompatible user libraries, graphics systems, and/or application frameworks. Therefore, applications developed for mobile OS 130 may not run directly on desktop OS 160, and applications developed for desktop OS 160 may not run directly on mobile OS 130. For example, application 352, running in application layer 350 of mobile OS 130, may be incompatible with desktop OS 160, meaning that application 352 could not run on desktop OS 160. Specifically, application 352 may depend on manager(s)

342, service(s) 344, and/or libraries 332 of mobile OS 130 that are either not available or not compatible with manager(s) 372, service(s) 374, and/or libraries 362 of desktop OS 160.

As a result, mobile OS 130 and desktop OS 160 may have different sets of available applications. In this regard, mobile OS 130 and desktop OS 160 of OS architecture 300 provide separate user experiences through separate sets of applications accessible through separate user interaction spaces. The user may access the applications available on (i.e., compiled for and loaded within the execution environment of) mobile OS 130 through a first user interaction space associated with mobile OS 130, and the applications available on desktop OS 160 through a second user interaction space associated with desktop OS 160.

As described above, mobile operating systems typically do not use the same graphics environment OS desktop operating systems. Graphics environments for desktop OSs were designed for flexibility and high performance. For example, the X-window system, used by some desktop OSs, provides platform and network independence at the expense of greater processing and system resources. In contrast, graphics environments for mobile OSs are designed more for efficiency and the specific user input devices of a mobile computing environment and less for flexibility. Because the graphics environments of mobile and desktop OSs are often different, an application running on a mobile OS may not be re-directed to display within a user space of a desktop OS by re-directing the graphics information from the graphics server of the mobile OS to the graphics server of the desktop OS.

The most widely adopted mobile OS is Google's Android. While Android is based on Linux, it includes modifications to the kernel and other OS layers for the mobile environment and mobile processors. In particular, while the Linux kernel is designed for a PC (i.e., x86) CPU architecture, the Android kernel is modified for ARM-based mobile processors. Android device drivers are also particularly tailored for devices typically present in a mobile hardware architecture including touch-screens, mobile connectivity (GSM/EDGE, CDMA, Wi-Fi, etc.), battery management, GPS, accelerometers, and camera modules, among other devices. In addition, Android does not have a native X Window System nor does it support the full set of standard GNU libraries, and this makes it difficult to port existing GNU Linux applications or libraries to Android.

Apple's iOS operating system (run on the iPhone) and Microsoft's Windows Phone 7 are similarly modified for the mobile environment and mobile hardware architecture. For example, while iOS is derived from the Mac OS X desktop as, common Mac OS X applications do not run natively on iOS. Specifically, iOS applications are developed through a standard developer's kit ("SDK") to run within the "Cocoa Touch" runtime environment of iOS, which provides basic application infrastructure and support for key iOS features such as touch-based input, push notifications, and system services. Therefore, applications written for Mac OS X do not run on iOS without porting. In addition, it may be difficult to port Mac OS X applications to iOS because of differences between user libraries and/or application framework layers of the two OSs, and/or differences in system resources of the mobile and desktop hardware.

Figure 4:
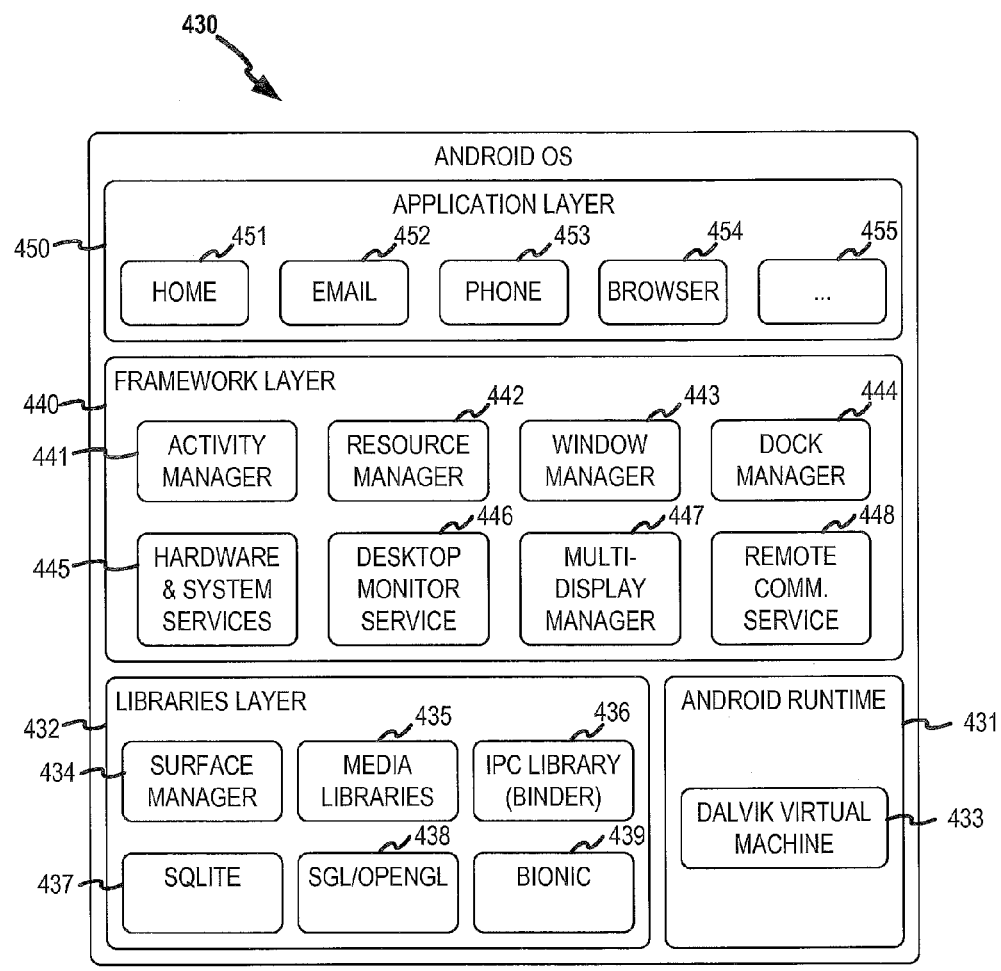
FIG. 4 illustrates an exemplary computing environment employing various aspects of embodiments.
Figure 5:
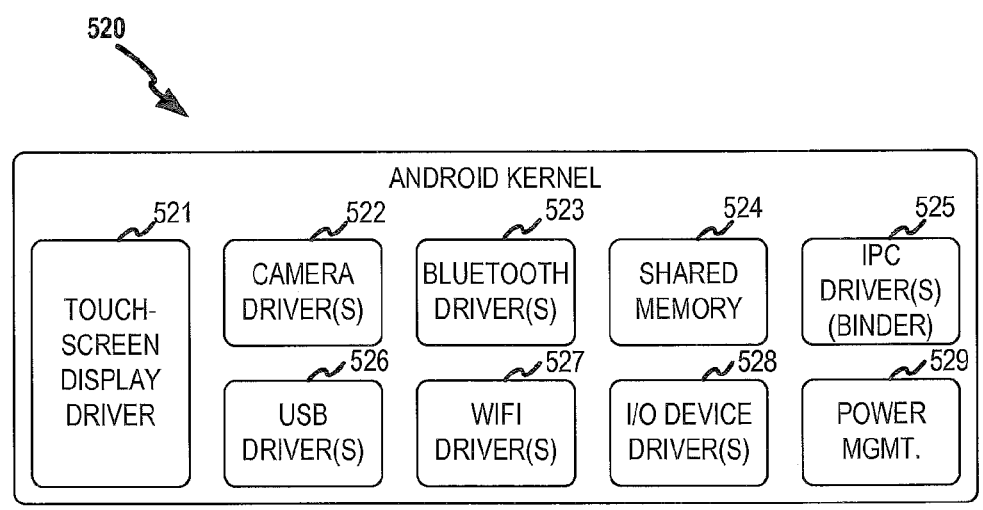
FIG. 5 illustrates aspects of an operating system architecture for a computing environment, according to various embodiments.
Figure 6:
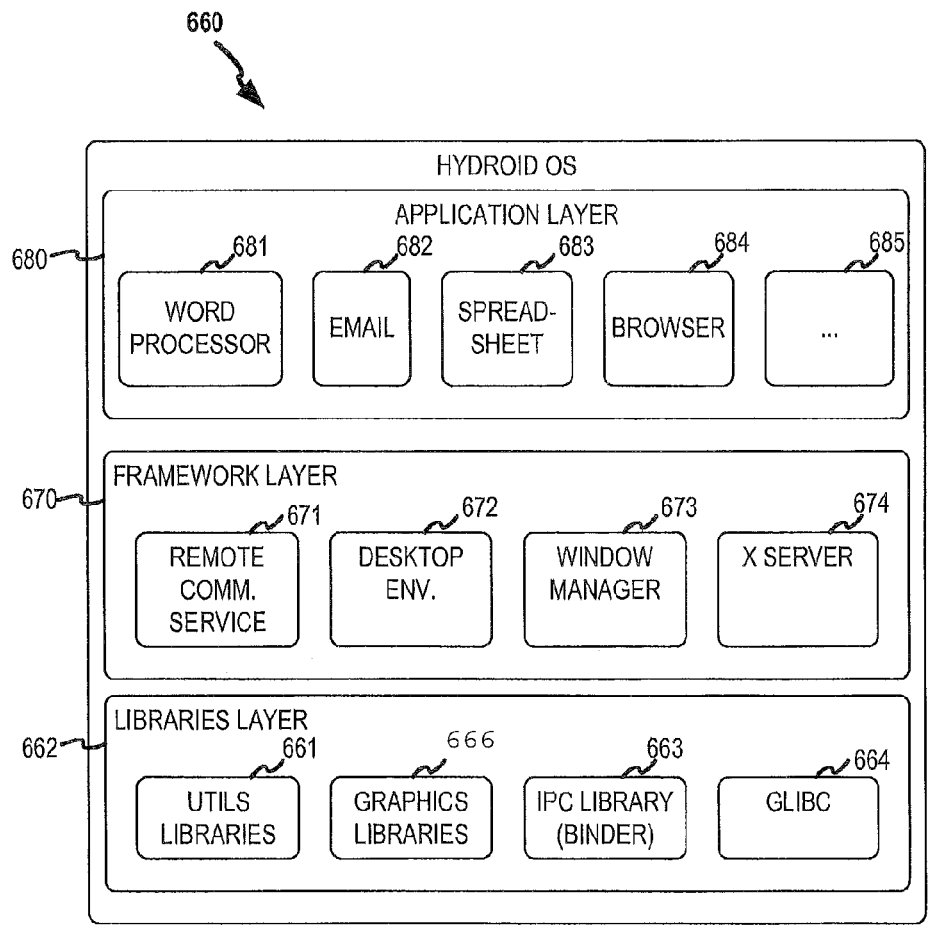
FIG. 6 illustrates an exemplary boot procedure that may be used to configure an operating system architecture of a mobile computing device in more detail, according to various embodiments.

In one embodiment consistent with OS architecture 300, an Android mobile OS and a full Linux OS run independently and concurrently on a modified Android kernel. In this embodiment, the Android OS may be a modified Android distribution while the Linux OS ("Hydroid™") may be a modified Debian™ Linux desktop OS. FIGS. 4-6 illustrate Android mobile OS 430, Android kernel 520, and Hydroid OS 660 that may be employed in OS architecture 300 in more detail, according to various embodiments.

As illustrated in FIG. 4, Android OS 430 includes a set of C/C++ libraries in libraries layer 432 that are accessed through application framework layer 440. Libraries layer 432 includes the "bionic" system C library 439 that was developed specifically for Android to be smaller and faster than the "glibc" Linux C-library. Libraries layer 432 also includes inter-process communication ("IPC") library 436, which includes the base classes for the "Binder" IPC mechanism of the Android OS. Binder was developed specifically for Android to allow communication between processes and services. Other libraries shown in libraries layer 432 in FIG. 4 include media libraries 435 that support recording and playback of media formats, surface manager 434 that managers access to the display subsystem and composites graphic layers from multiple applications, 2D and 3D graphics engines 438, and lightweight relational database engine 437. Other libraries that may be included in libraries layer 432 but are not pictured in FIG. 4 include bitmap and vector font rendering libraries, utilities libraries, browser tools (i.e., WebKit, etc.), and/or secure communication libraries (i.e., SSL, etc.).

Application framework layer 440 of Android OS 430 provides a development platform that allows developers to use components of the device hardware, access location information, run background services, set alarms, add notifications to the status bar, etc. Framework layer 440 also allows applications to publish their capabilities and make use of the published capabilities of other applications. Components of application framework layer 440 of Android mobile OS 430 include activity manager 441, resource manager 442, window manager 443, dock manager 444, hardware and system services 445, desktop monitor service 446, multi-display manager 447, and remote communication service 448. Other components that may be included in framework layer 440 of Android mobile OS 430 include a view system, telephony manager, package manager, location manager, and/or notification manager, among other managers and services.

Applications running on Android OS 30 run within the Dalvik virtual machine 433 in the Android runtime environment 431 on top of the Android object-oriented application framework. Dalvik virtual machine 433 is a register-based virtual machine, and runs a compact executable format that is designed to reduce memory usage and processing requirements. Applications running on Android OS 430 in application layer 450 include home screen 451, email application 452, phone application 453, browser application 454, and/or other application(s) ("App(s)") 455.

The Android OS graphics system uses a client/server model. A surface manager ("SurfaceFlinger") is the graphics server and applications are the clients. SurfaceFlinger maintains a list of display ID's and keeps track of assigning applications to display ID's. In one embodiment, mobile computing device 110 has multiple touch screen displays 116. In this embodiment, display ID 0 is associated with one of the touch screen displays 116 and display ID 1 is associated with the other touch screen display 116. Display ID 2 is associated with both touch screen displays 116 (i.e., the application is displayed on both displays at the same time). Display ID's greater than 2 are virtual displays, meaning that they are not associated with a display physically present on mobile computing device hardware 112.

Graphics information for Android applications includes windows, views, and canvasses. Each window, view, and/or canvas is implemented with an underlying surface object. Surface objects are double-buffered (front and back buffers)

and synchronized across processes for drawing. Surface-Flinger maintains all surfaces in a shared memory pool which allows all processes within Android to access and draw into them without expensive copy operations and without using a server-side drawing protocol such as X-Windows. Applications always draw into the back buffer while SurfaceFlinger reads from the front buffer. SurfaceFlinger creates each surface object, maintains all surface objects, and also maintains a list of surface objects for each application. When the application finishes drawing in the back buffer, it posts an event to SurfaceFlinger, which swaps the back buffer to the front and queues the task of rendering the surface information to the frame buffer.

SurfaceFlinger monitors all window change events. When one or more window change events occur, SurfaceFlinger renders the surface information to the frame buffer for one or more displays. Rendering includes compositing the surfaces, i.e., composing the final image frame based on dimensions, transparency, z-order, and visibility of the surfaces. Rendering may also include hardware acceleration (e.g., OpenGL 2D and/or 3D interface for graphics processing hardware). SurfaceFlinger loops over all surface objects and renders their front buffers to the frame buffer in their Z order.

FIG. 5 illustrates modified Android kernel 520 in more detail, according to various embodiments. Modified Android kernel 520 includes touch-screen display driver 521, camera driver(s) 522, Bluetooth driver(s) 523, shared memory allocator 524, IPC driver(s) 525, USB driver(s) 526, WiFi driver(s) 527, I/O device driver(s) 528, and/or power management module 539. I/O device driver(s) 528 includes device drivers for external I/O devices, including devices that may be connected to mobile computing device 110 through port 120. Modified Android kernel 520 may include other drivers and functional blocks including a low memory killer, kernel debugger, logging capability, and/or other hardware device drivers.

FIG. 6 illustrates Hydroid OS 660 in more detail, according to various embodiments. Hydroid is a full Linux OS that is capable of running almost any application developed for standard Linux distributions. In particular, libraries layer 662 of Hydroid OS 660 includes Linux libraries that support networking, graphics processing, database management, and other common program functions. For example, user libraries 662 may include the "glibc" Linux C library 664, Linux graphics libraries 666 (e.g., GTK, OpenGL, etc.), Linux utilities libraries 661, Linux database libraries, and/or other Linux user libraries. Applications run on Hydroid within an X-Windows Linux graphical environment using X-Server 674, window manager 673, and/or desktop environment 672 within framework 670. Illustrated applications of application layer 680 include word processor 681, email application 682, spreadsheet application 683, browser 684, and other application(s) 685.

The Linux OS graphics system is based on the X-windows (or "XII") graphics system. X-windows is a platform-independent, networked graphics framework. X-windows uses a client/server model where the X-server is the graphics server and applications are the clients. The X-server controls input/output hardware associated with the Linux OS such as displays, touchscreen displays, keyboards, pointing device(s), etc. In this regard, X-windows provides a serverside drawing graphics architecture, i.e., the X-server maintains the content for drawables including windows and pixmaps. X-clients communicate with the X-server by exchanging data packets that describe drawing operations over a communication channel. X-clients access the X communication protocol through a library of standard routines (the "Xlib"). For example, an Xclient may send a request to the X-server to draw a rectangle in the client window. The X-server sends input events to the X-clients, for example, keyboard or pointing device input, and/or window movement or resizing. Input events are relative to client windows. For example, if the user clicks when the pointer is within a window, the X-server sends a packet that includes the input event to the X-client associated with the window that includes the action and positioning of the event relative to the window.

Because of the differences in operating system frameworks, graphics systems, and/or libraries, applications written for Android do not generally run on Hydroid OS 660 and applications written for standard Linux distributions do not generally run on Android OS 430. In this regard, applications for Android OS 430 and Hydroid OS 660 are not bytecode compatible, meaning compiled and executable programs for one do not run on the other.

In one embodiment, Hydroid OS 660 includes components of a cross-environment communication framework that facilitates communication with Android OS 430 through shared kernel 520. These components include IPC library 663 that includes the base classes for the Binder IPC mechanism of the Android OS and remote communications service 671.

In one embodiment, Hydroid OS 660 is run within a chrooted (created with the 'chroot' command) secondary execution environment created within the Android root environment. Processes and applications within Hydroid OS 660 are run within the secondary execution environment such that the apparent root directory seen by these processes and applications is the root directory of the secondary execution environment. In this way, Hydroid OS 660 can run programs written for standard Linux distributions without modification because Linux user libraries 662 are available to processes running on Hydroid OS 660 in the chrooted secondary execution environment.

Referring back to FIG. 3, mobile OS 130 and desktop 160 are in active concurrent execution on shared kernel 320 on a mobile device. Mobile OS 130 and desktop OS 160 may be incompatible with regard to user libraries, graphics systems, and/or application frameworks. Therefore, mobile OS 130 and desktop OS 160 have different sets of available applications, meaning that at least some applications available on mobile OS 130 are not available on desktop OS 160 and vice-versa. Accordingly, mobile OS 130 and desktop OS 160 of OS architecture 300 provide separate user experiences through different sets of applications accessible through separate user interaction spaces. The user may access the applications available on (i.e., compiled for and loaded within the execution environment of) mobile OS 130 through the user interaction space associated with mobile OS 130, and the applications available on desktop OS 60 through the user interaction space associated with desktop OS 160.

Embodiments of the present invention extend the functionality of OS architecture 300 to provide a more seamless computing experience in a multi-OS computing environment. Embodiments include cross-environment rendering of applications and/or the user interaction space of a first operating system within a user interaction space of a second operating system, even where the graphics environments of the first and second operating systems are not compatible. Embodiments further include user-interaction support of cross-environment applications, and accessing applications of the first operating system from the user interaction space of the second operating system. This functionality enables, for example, mobile OS applications, running on mobile OS 130, to be displayed and interacted with through a user interaction space associated with desktop OS 160. For example, while a user is interacting with desktop OS 160 through a user interaction space associated with desktop OS 160, the user may wish to have access to a particular application of mobile OS 130 that is not available for (i.e., is not compiled for and does not run on) desktop OS 160. Using various embodiments disclosed below, the user may access, display, and interact with an application compiled for and running on mobile OS 130 through the user interaction space associated with desktop OS 160. Notably, the embodiments provide cross-environment interaction support with any application of the mobile OS, meaning that mobile OS applications do not need to be modified to include specific cross-environment support to use the embodiments below.

To provide seamless cross-environment user interaction support for an application and/or the user interaction space of a first OS (e.g., mobile OS 130) from within a user interaction space of a second OS (e.g., desktop OS 160), it may be desirable for graphics data of the application and/or the user interaction space (i.e., graphics context or active display) to be rendered for display in the user interaction space of the second OS in real-time. Real-time (or instant) rendering, in this context, means that graphics data of the application is rendered to the user interaction space of the second OS fast enough that the user can interact with the application without a noticeable or substantial reduction in application performance due to delays associated with transferring the graphics information. In this regard, the techniques for real-time (or instant) cross-environment rendering, as described herein, provide for rapid transfer of graphics information, for example, with a limited number of frame delays or other delays associated with copying or transferring the graphics information from the first OS to the second OS. However, it does not mean that the graphics transfer does not take any time, and the cross-environment rendering techniques disclosed herein may be considered instant or in real-time, even though a finite time period passes before the graphics information is displayed on the user interaction space of the second OS.

To achieve cross-environment rendering of applications, a potentially large amount of graphics data may be passed from the application running in the first operating system to a graphics system of the second operating system. Existing mechanisms are not capable of transferring the required graphics data without potentially affecting the display update or frame rate. For example, transferring graphics data directly would not be practical within the constraints of a mobile computing environment. Compression techniques could be used to reduce the total amount of data to be transferred, but at the cost of increased processing requirements to compress and de-compress the information. Remote desktop-like systems could be used to pass vector graphics or graphics update information, however, these are also typically slow when transferring large amounts of graphics data or for rapidly changing graphics content.

Figure 7:
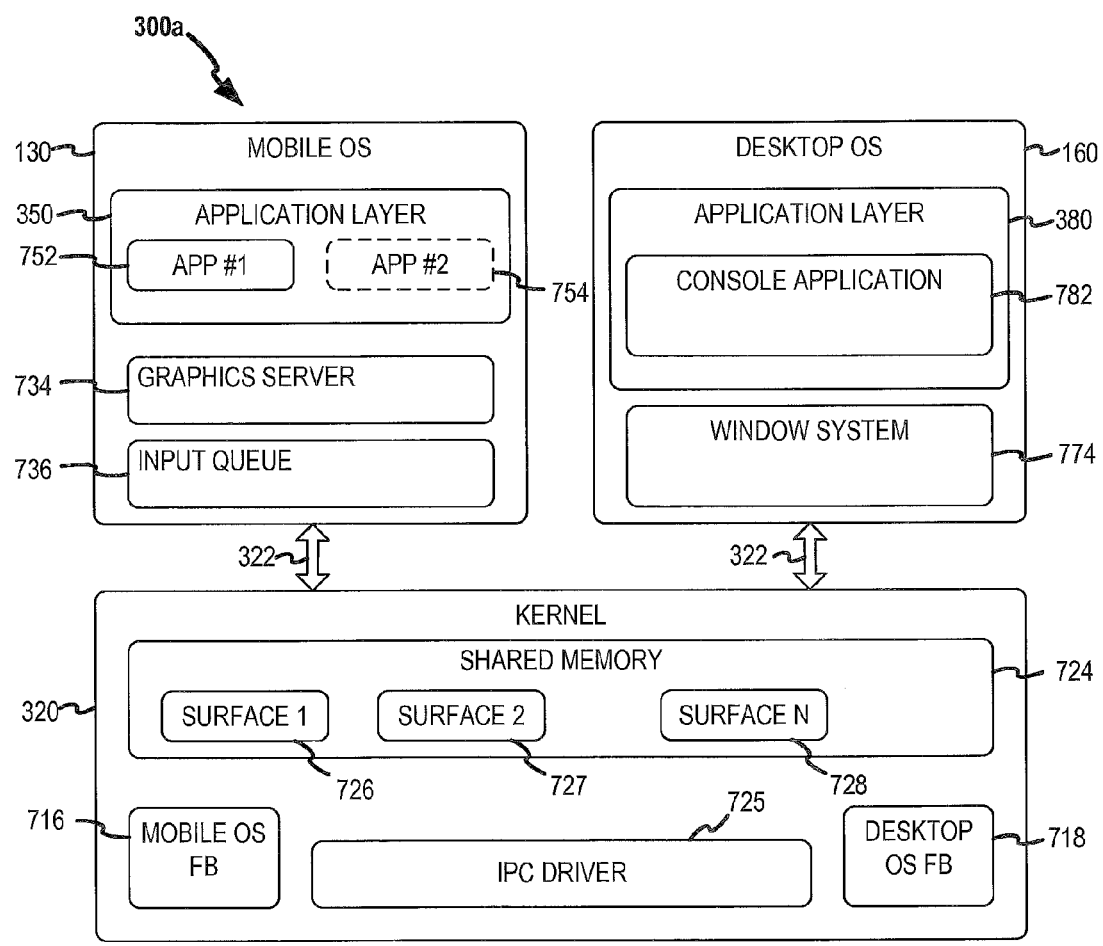
FIG. 7 illustrates an operating system architecture configuration for providing cross-environment rendering of applications and/or user interaction spaces, according to various embodiments.

FIG. 7 illustrates OS architecture configuration 300*a*, which may be employed to provide cross-environment rendering of an application and/or the user interaction space of a first OS within a user interaction space of a second OS where the first and second OS are running concurrently on a shared kernel and are associated with separate user interaction spaces that include separate display devices, according to various embodiments. Components of OS architecture configuration 300*a* allow applications running on mobile OS 130 and/or the graphics context of mobile OS 130 to be rendered within the user interaction space of desktop OS 160, where OS 130 and desktop OS 160 run concurrently on shared kernel 320. In various embodiments, an application is displayed in a console window in the user interaction space of desktop OS 160 through console application 782 of desktop OS 160. In one implementation, console application 782 is an X-windows type application that is displayed within the user interaction space of desktop OS 160 through an X-windows type graphics system of desktop OS 160.

In OS architecture configuration 300*a*, mobile OS 130 includes graphics server 734 that allocates and manages surface information (e.g., surfaces 726, 727, and 728) for applications (e.g., application 752 and 754) of mobile OS 130. In one embodiment, graphics server 734 allocates memory for graphics surfaces using anonymous shared memory (i.e., named memory blocks shared between processes that the kernel is allowed to free). Graphics server 734 also allocates and tracks displays of mobile OS 130, including displays that are integrated within mobile computing device hardware 112 (i.e., local displays) and so-called virtual displays through which applications of mobile OS 130 may be displayed remotely (i.e., within a user interaction space of another OS. Mobile OS 130 may also include a window system for displaying multiple applications at the same time on a display screen associated with mobile OS 130. In one embodiment, mobile OS 130 includes a service that provides a remote communication channel for access to components of mobile OS 130 from desktop OS 160.

OS architecture configuration 300*a* includes a first application 752 that is running on mobile OS 130 and displayed within a first user interaction space associated with mobile OS 130. OS architecture configuration 300*a* includes a second application 754 that is also running on mobile OS 130, but is displayed within a second user interaction space associated with desktop OS 160 through cross-environment rendering according to embodiments described below. In one embodiment, application 754 is displayed within a console window of the second user interaction space through console application 782 running on desktop OS 160.

Generally, applications of mobile OS 130 instantiate views through which the user interacts with the application. For example, an application may have a single view that makes up the application window. Within views, applications instantiate drawing objects for specific areas of the application interface. The drawing objects may be called canvases or drawing layers and are the objects through which the application draws graphics information. When an application instantiates a canvas or layer, graphics server 734 allocates memory for the surface information associated with the canvas or layer and returns the drawing object to the application, which the application then uses to draw graphics information for the surfaces of the canvas or layer. Graphics server 734 then monitors the surface information and renders the surface information into the frame buffer (e.g., frame buffer 716) when the surface information is updated. Typically, the user also interacts with the application through the view objects. The view objects include event listeners that are called by the mobile OS input queue 736 when actions are performed by the user on the view object.

As illustrated in OS architecture 300*a*, surfaces 726, 727, and/or 728 are allocated by graphics server 734 in shared memory 724. Shared memory 724 is managed by shared kernel 320 and is accessible by all processes running on mobile OS 130 and desktop OS 160. As described above, shared memory 724 may be named shared memory. While named shared memory is accessible by all processes running on shared kernel 320, other processes cannot access regions of named shared memory by name. Accordingly, a file descriptor to regions of named shared memory must be passed through an inter-process communication mechanism to pass a reference to named shared memory across process boundaries. Shared kernel 320 also includes IPC driver 725, which allows processes in mobile OS 130 and desktop OS 160 to communicate with one another across process boundaries. IPC driver 725 may be, for example, a Unix domain socket driver, Android Binder driver, and/or network socket driver.

Desktop OS 160 of OS architecture configuration 300a includes console application 782 and window system 774. Console application 782 is compiled for and runs on desktop OS 160, and is displayed within a console window in the user interaction space associated with desktop OS 160. Window system 774 may include a window manager, graphics server, and/or graphics device interface that provides the basis for representing graphical objects and transmitting them to display devices through desktop OS frame buffer 718. For example, window system 774 may display console application 782 within the user interaction space of desktop OS 160 through desktop OS frame buffer 718. Window system 774 also provides input events from the user environment of desktop OS 160 associated with console application 782 to console application 782. For example, window system 774 may provide pointing device location or gesture information from the user interaction space associated with desktop OS 160 to console application 782.

In FIG. 7, memory blocks including shared memory 724, mobile OS frame buffer 716, and desktop OS frame buffer 718 are shown as located within shared kernel 320 for ease of illustration. However, these memory blocks are physically located in tangible memory storage elements of mobile computing device 110 and managed by shared kernel 320. For example, these memory blocks may be located in RAM on processor 114, and/or in RAM of memory device 206 of mobile computing device hardware 112 illustrated in FIG. 2.

OS architecture configuration 300a provides support for cross-environment rendering of applications of a first operating system running on a shared kernel within a user interaction space associated with a second operating system, where the first and second operating systems run concurrently on the shared kernel. OS architecture configuration 300a may be employed to provide support for cross-environment rendering in a computing environment that provides multiple user computing experiences through multiple user interaction spaces. For example, OS architecture configuration 300a may be used in computing environment 100 as illustrated in FIG. 1.

Figure 8:
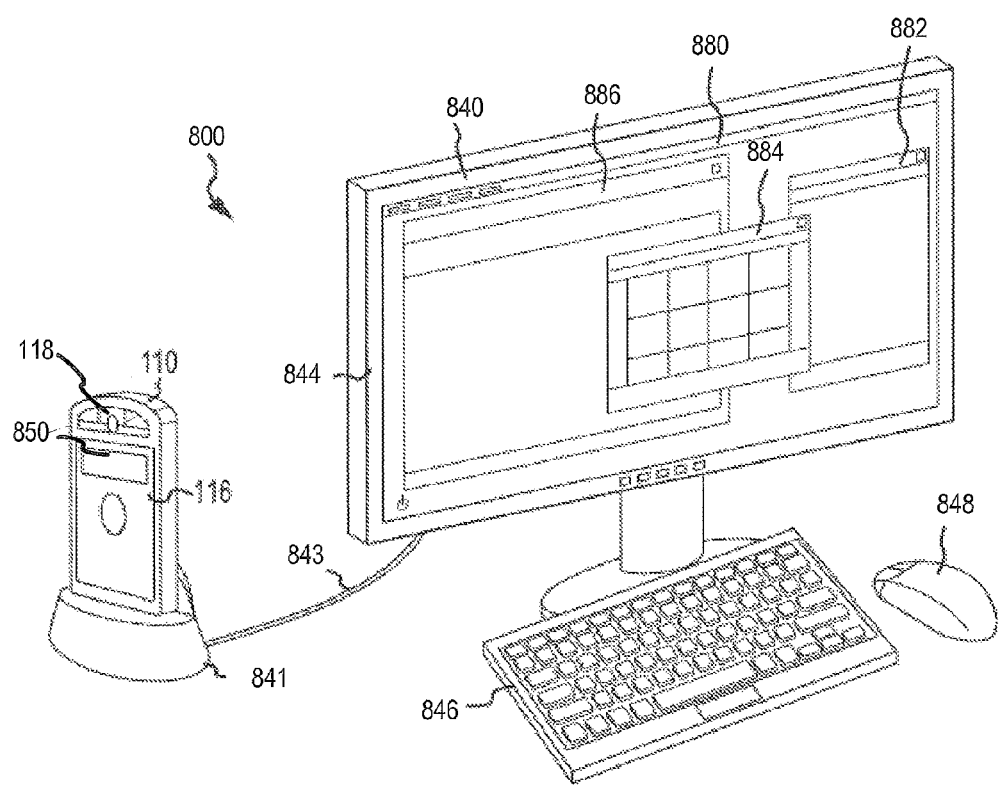
FIG. 8 illustrates a computing environment with multiple user environments, according to various embodiments.

FIG. 8 illustrates computing environment 800, according to various embodiments. Computing environment 800 has a first user environment that includes touch-screen display(s) 116 and other I/O devices 118 of mobile computing device hardware 112. This user environment presents a first user interaction space through which the user interacts with mobile OS 130. A second user environment of computing environment 800 includes display monitor 844, keyboard 846, and/or pointing device 848. User environment 840 may be connected to mobile computing device 110 through dock connector 841 and dock cable 843. Dock connector 841 and dock cable 843 may include a port that interfaces through dock interface 122 to port 120 of mobile computing device 110 as illustrated in FIG. 1. In this regard, user environment 840 provides a docked secondary terminal environment to mobile computing device 110. In computing environment 800, desktop OS 160 may be associated with docked secondary terminal environment 840 such that the user can interact with desktop OS 160 through the user interaction space provided by secondary terminal environment 840. While secondary terminal environment 840 is illustrated as a typical desktop-type computing environment, desktop OS 160 may present a second user interaction space through other types of computing environments, including laptop, tablet, and/or other types of computing environments.

OS architecture configuration 300a may be used within computing environment 800 to provide cross-environment rendering of applications running on a first OS (i.e., mobile OS) and displayed within a user environment of a second OS (i.e., user environment 840 associated with desktop OS 160). For example, application 754, running on mobile OS 130, may be displayed within console window 882 on the user interaction space 880 of desktop OS 160. Other windows within user interaction space 880, including window 884 and 886, may be windows of other applications running on desktop OS 160. To the user, computing environment 800 provides a seamless computing experience for application 754 because application 754 can be used within the user interaction space of desktop OS 160 as if it was running on desktop OS 160, while in fact application 754 is running on mobile OS 130.

FIG. 8 illustrates a desktop-like secondary terminal environment 840. In this instance, the user may interact with an application and/or the user interaction space of the mobile OS through console window 882 using keyboard 846 and mouse 848 (i.e., a primarily pointing device-based GUI) of secondary terminal environment 840. However, cross-environment rendering of an application and/or mirroring of the mobile OS user interaction space may be used with other secondary terminal environments. For example, desktop OS 160 could be associated with a tablet-like secondary terminal environment that includes a touch-screen display. In this instance, the user may interact with a cross-environment application or mirrored user interaction space of mobile OS 130 in much the same manner (i.e., a primarily gesture-based GUI) in which the user typically interacts with the user interaction space of mobile OS 130.

As discussed above, embodiments of the invention are directed to providing concurrent user interface support across cross-environment applications and/or a mirrored user interaction space in a multiple-OS computing environment. In one example, user interface support is provided for cross-environment applications to allow an application, running on a first OS, to be displayed and interacted with through a user interaction space of a second OS, substantially as if running natively on the second operating system.

Non-Extended Rendering Context Embodiments

Some embodiments handle concurrent user interface support across multiple OSs without extending the graphics rendering context of the first operating system. The first OS (e.g., the mobile OS, Android) is typically configured to define a single, active user interaction space. The user interaction space includes an active display (e.g., with associated characteristics, like resolution) and one or more active input devices for allowing user interaction with the elements displayed on the active display. Accordingly, the first OS establishes a rendering context through which it can render surface information for applications that are running for display to the active display.

As described above, however, novel techniques are described herein for effectively fooling the first OS into concurrently handling multiple user interaction spaces. Moreover, the techniques allow the multiple user interaction spaces to be associated with different (e.g., incompatible) operating systems on multiple computing environments. Some embodiments involve techniques for handling the display outputs through cross-environment remote rendering. Other embodiments involve techniques for handling the user interaction in those contexts.

In cross-environment remote rendering, application graphics for an application running on the first OS and displayed within a computing environment associated with a second OS are rendered from within the second OS. In one embodiment, a console application, running on the second OS accesses surface information for the application from shared memory and renders the application within a console window of the computing environment associated with the second OS.

Suppose that a calendar application and a word processing application are both compiled for and concurrently running on a first OS (e.g., mobile OS 130) on a mobile device. A second OS (e.g., a non-mobile OS, like desktop OS 160) is running concurrently on the mobile device using a shared kernel. A user has docked the mobile device with a second, desktop computing environment, and desires to interact with the word processing application through that desktop computing environment. It is desirable to handle the user interaction space of the desktop computing environment using the second OS of the mobile computing environment (i.e., the mobile device) in a way that is transparent to the user.

Figure 9:
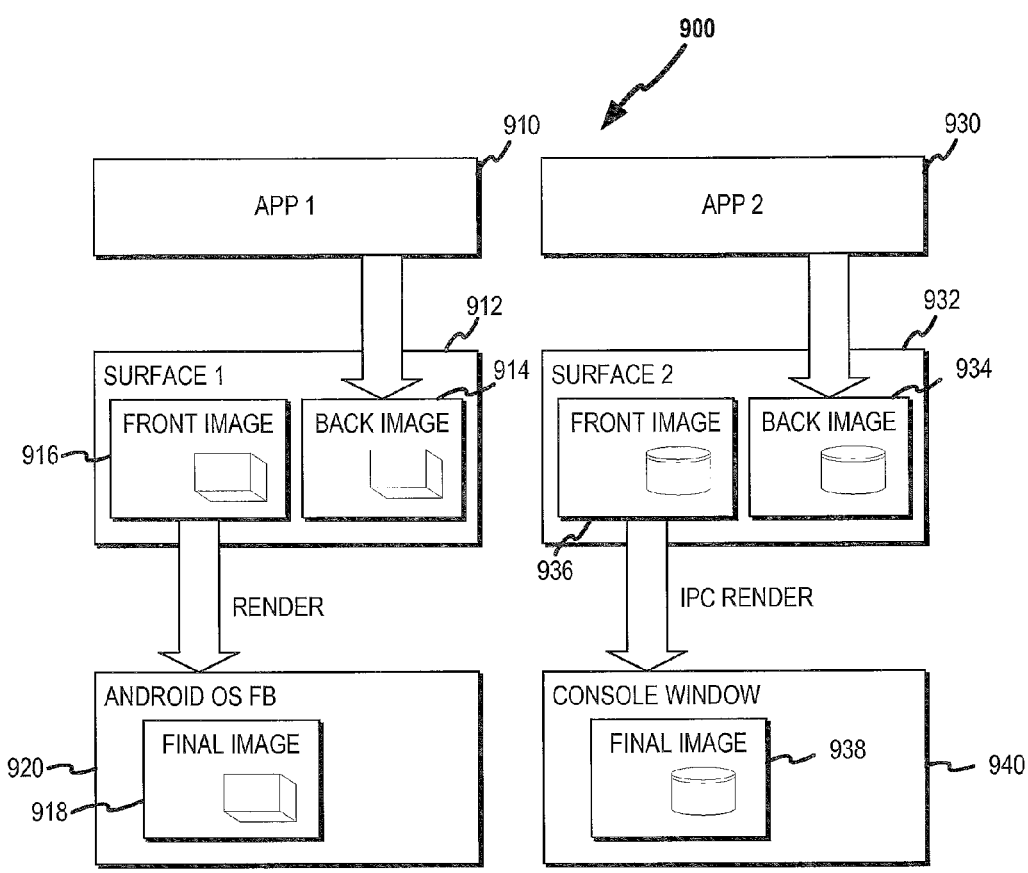
FIG. 9 illustrates aspects of cross-environment remote rendering, according to various embodiments.

FIG. 9 illustrates aspects of cross-environment remote rendering, according to various embodiments. In application rendering diagram 900 illustrated in FIG. 9, the first application 910 (e.g., calendar application) calculates updates for a first surface 912 within the first OS. The first surface 912 is stored in a first memory location in a shared memory space by the first operating system. For example, the first memory location may be a region of named shared memory. The first application 910 updates the back buffer 914 of the first surface 912. Similarly, the second application 930 (e.g., word processing application) calculates updates for a second surface 932 using the first OS. The second surface 932 is stored in a second memory location in the shared memory space (e.g., a second region of named shared memory) by the first OS.

The first OS determines when to initiate a rendering sequence. For example, the first OS may initiate a rendering sequence when surface information for surfaces 912 and/or 932 has changed. The first may perform a single loop over all surfaces, including the first surface 912 and second surface 932, determining whether surface information associated with particular applications has changed. In the rendering sequence, if surface information for surface 912 has changed, the first OS swaps the front buffer 916 and back buffer 914, such that the surface information that was in the back buffer 914 is now in front buffer 916. The first operating system renders the first surface 912 into a third memory location 920 to create the final image 918 to be displayed within a first user interaction space associated with the first OS.

If surface information for the second surface 932 has changed, the first OS notifies the second OS that the surface information for the second surface 932 has changed. Specifically, the first OS sends a draw notification to a console application of the second OS indicating that surface 932 has been updated through an inter-process communication channel. The draw notification may include a file descriptor to the front image 936, and/or other characteristics of the shared memory space for front image 936 including buffer size, layer order, etc. The console application maps the file descriptor to its process space to obtain a reference to the second memory location. Through the reference to the second memory location, the console application of the second OS reads directly the surface information from the front image buffer 936 and renders the surface information for the front image 936 of the second surface 932 in a console window 940 within a second user interaction space associated with the second OS. In this way, the console application can render the second application 930 in the console window 940 in real-time without copying a graphics frame or surface information across processes. Instead, the console application reads the surface information directly by mapping the shared memory of the second surface 932 to its own process space using the file descriptor passed through inter-process communication.

Figure 10:
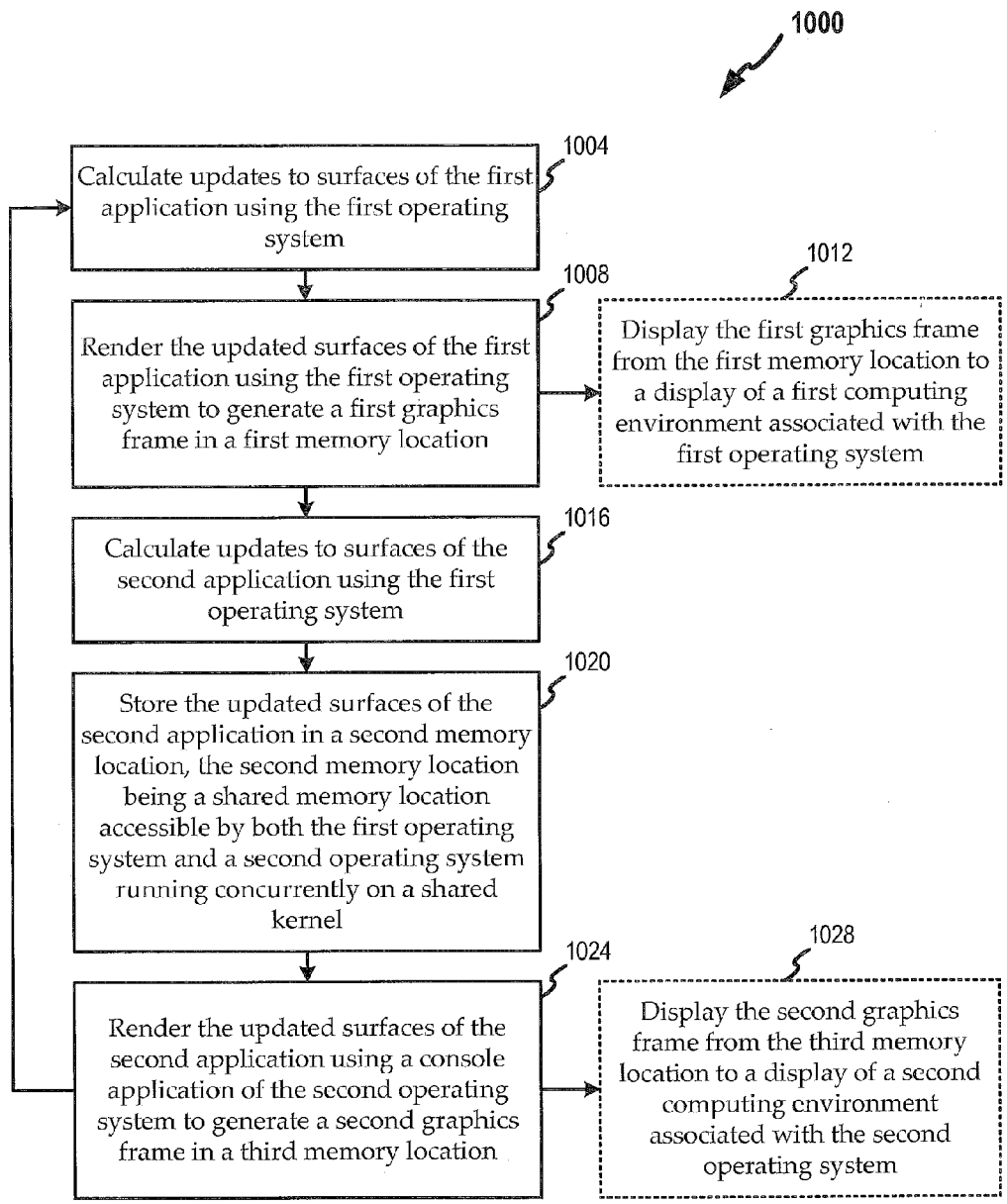
FIG. 10 shows a flow diagram of an illustrative method for cross-environment remote rendering in a non-extended rendering context, according to various embodiments.

FIG. 10 shows a flow diagram 1000 of an illustrative method for cross-environment remote rendering in a non-extended rendering context, according to various embodiments. Embodiments maintain display of application graphics for a first application (e.g., the calendar application) and a second application (e.g., the word processing application), both compiled for and in active concurrent execution within a first operating system.

The method 1000 begins at block 1004 by calculating updates to surfaces of the first application using the first operating system. Calculating updates to the surfaces may involve using application data to determine which surfaces have changed and in what ways. For example, user interaction may have caused some surfaces to change position, order (e.g., one layer may be partially in front of another layer, completely hidden by another layer, etc.), size, color, texture, etc.

At block 1008, these updated surfaces of the first application are rendered using the first operating system to generate a first graphics frame in a first memory location. For example, a rendering engine of the first OS previously established a rendering context associated with a display. A graphics frame can then be rendered by iterating through the updated surface information to effectively draw a full or partial image of visible portions of surfaces from the first application according to characteristics (e.g., resolution) of the display associated with the rendering context. This graphics frame is rendered to a first memory location. The memory location can be frame buffer memory, shared memory, or any other useful memory location.

In some embodiments, at block 1012, the rendered first graphics frame is displayed from the first memory location to a display of a first computing environment associated with the first operating system. For example, the first graphics frame is rendered into a back buffer portion of the frame buffer of the mobile device. Subsequently, the frame buffer flips (i.e., the back buffer portion becomes the front buffer portion) and the now-front buffer portion of the frame buffer is 25 displayed to the display of the mobile device.

At block 1016, updates are calculated to surfaces of the second application using the first operating system. This may be performed substantially identically to the calculation of block 1004 for surfaces of the first application. Unlike with the updated surface data of the first application, however, the updated surface information of the second application is not rendered by the first OS. Rather, at block 1020, the updated surfaces of the second application are stored in a second memory location. The second memory location is a shared memory location accessible by both the first and second OSs, which are running concurrently on the shared kernel of the mobile device.

At block 1024, the updated surfaces of the second application are rendered using a console application of the second operating system to generate a second graphics frame in a third memory location. For example, console application 782 of FIG. 7 may render updated surfaces of application 754 into frame buffer memory of the second OS (e.g., associated with the display of the second computing environment). In some embodiments, at block 1028, the second graphics frame is displayed from the third memory location to a display of a second computing environment associated with the second operating system. For example, the display driver of the desktop computing environment display accesses the frame buffer memory to access and display the second graphics frame. In certain implementations, the console application also maintains a console interaction space, and the second graphics frame is rendered into the console interaction space. For example, the console application renders one or more windows on the desktop display, and the graphics of the second application are displayed in one of those windows.

In some embodiments, the method 1000 iterates through the blocks to concurrently maintain the graphics environments for both applications. For example, the mobile OS calculates updates to the first application's graphics and renders those updates to mobile frame buffer memory; then the mobile OS calculates updates to the second application's graphics and stores those updates to shared memory, from where the desktop os's console application renders those updates to desktop frame buffer memory; then the method 1000 repeats with the next set of updates. Notably, some implementations perform certain steps out of order and/or in parallel. For example, it may be possible to calculate updates to surfaces for the first and second applications at substantially the same time (i.e., perform blocks 1004 and 1016 substantially in parallel), though only a portion of those updated surfaces will be rendered locally (e.g., at block 1008) and the other portion of those updated surfaces will be stored for remote rendering (e.g., at blocks 1020 and 1024).

In one embodiment, an Android mobile OS and a full Linux OS (e.g., Hydroid) are running concurrently on a shared kernel on a mobile device. When an Android application is launched from Hydroid OS 660, a console application launches on Hydroid OS 660 and requests that Android OS 430 launch the Android application and send draw notifications for the Android application to the console application. Android OS 430 launches the Android application, associates the application with a virtual display ID and registers the console application to receive draw notifications for the application. For example, the Android graphics server (i.e., SurfaceFlinger) may allocate an unused virtual display ID and associate the application with the virtual display ID through an application object list. SurfaceFlinger allocates memory for surface information of the Android application in shared memory and registers the console application to receive draw notifications for the Android application.

When SurfaceFlinger determines that the surface information is updated, SurfaceFlinger sends a draw notification to the console application through an inter-process communication channel. For example, SurfaceFlinger may send the draw notification to the console application through a unix domain socket, Binder interface, and/or network socket. The draw notification includes a file descriptor to the surface information. The file descriptor may be generated by SurfaceFlinger based on a namespace for a named shared memory region of the surface. The draw notification may also include data format, buffer size, and surface position information. The console application maps the file descriptor to its process space and reads from the shared memory location through the mapped file descriptor. The console application then renders the graphics frame for the application directly from the surface information. The rendered graphics frame is then displayed by the desktop OS graphics system (i.e., through the X-windows graphics system of Hydroid OS 660).

Figure 11:
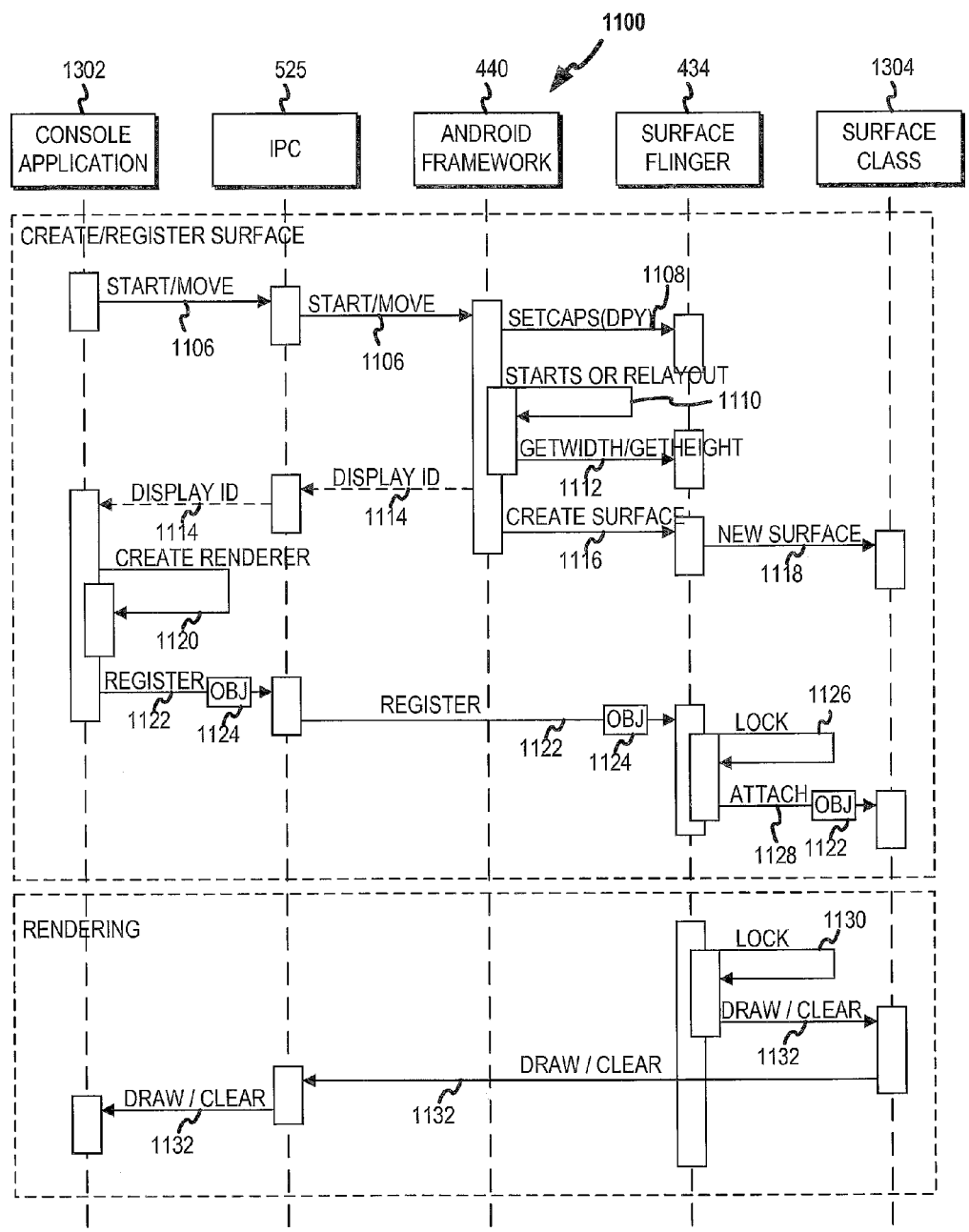
FIG. 11 illustrates a registration and drawing process flow for cross-environment remote rendering, according to various embodiments.

FIG. 11 illustrates a registration and drawing process flow 1100 for cross-environment remote rendering in more detail, according to various embodiments. Initially, console application 1102, running on Hydroid OS 660, requests through IPC channel 525 of shared kernel 520 at step 1106 that an Android application be started and displayed within a user environment of Hydroid OS 660, or moved from a user environment of Android OS 430 to a user environment of Hydroid OS 660. Android requests from SurfaceFlinger 434 a virtual display ID for the application, starts the application, and sets parameters for the virtual display at steps 1108, 1110, and 1112. At step 1114, Android returns the display ID to the console application through IPC channel 525. At step 1116, the application requests a new surface, which SurfaceFlinger 434 creates by creating an instance of surface class 1104 at step 1118.

Console application 1102 instantiates a renderer object at step 1120, which renders Android surface information through the X-window system of Hydroid OS 660. At step 1122, console application 1102 registers a remotable interface of the renderer object 1124 with SurfaceFlinger 434 to receive draw notifications for surface information for the Android application. In one embodiment, the remotable interface of the renderer object includes drawO and clearO methods that may be called through IPC channel 525. At steps 1126 and 1128, SurfaceFlinger attaches the IPC object to the surface such that the console application 1102 will be notified through the remotable interface when the surface information has been updated.

Steps 1130 and 1132 are part of the render loop of process flow 1100. In the render loop, SurfaceFlinger notifies console application 1102 that the surface information is updated and passes a file descriptor to the surface information through IPC channel 525. For example, a draw method of the console application renderer may be called and passed the file descriptor to the surface. Console application 1102 maps the file descriptor to its process space and accesses the referenced shared memory location to read the surface information and render the graphics frame to be displayed on a display of a second computing environment associated with Hydroid OS 660.

Figure 12:
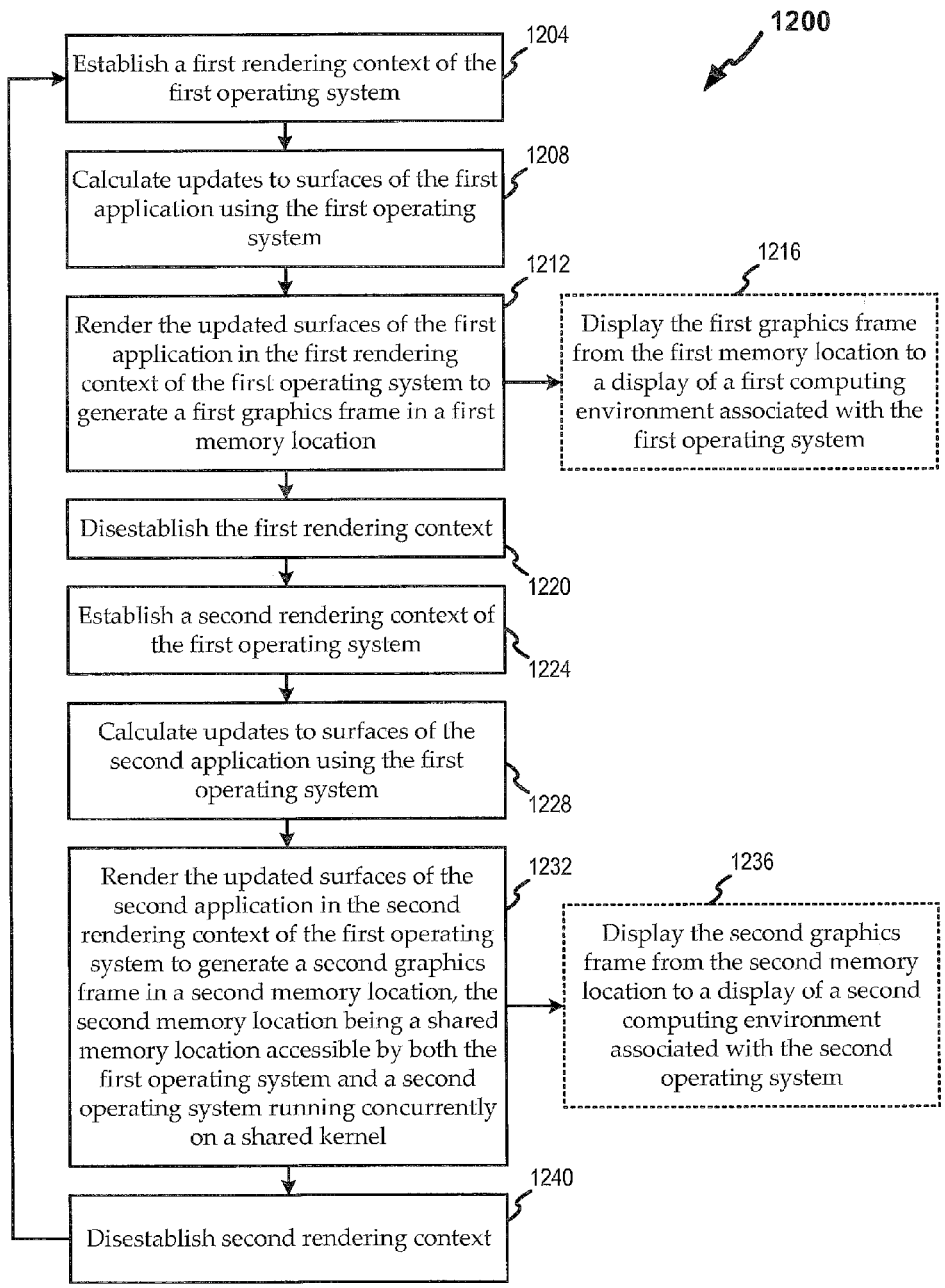
FIG. 12 shows a flow diagram of another illustrative method for cross-environment rendering in a non-extended rendering context, according to various embodiments.

FIG. 12 shows a flow diagram 1200 of another illustrative method for cross-environment rendering in a non-extended rendering context, according to various embodiments. As with the method 1000 of FIG. 10, embodiments maintain display of application graphics for a first application and a second application, both compiled for and in active concurrent execution within a first operating system.

The method 1200 begins at block 1204 by establishing a first rendering context of the first operating system. The rendering context may be unique to the display with which it is associated. For example, implementations of the mobile OS can be associated with a mobile device display having a certain resolution. The rendering context may be established to match the resolution of the associated display, so that graphics will be appropriately rendered for that resolution. At block 1208, the method 1200 calculates updates to surfaces of the first application using the first operating system. As discussed above, calculating updates to the surfaces may involve using application data to determine which surfaces have changed and in what ways.

The updated surfaces of the first application are then rendered using the first operating system, at block 1212, to generate a first graphics frame in a first memory location. Rendering typically involves converting graphical primitives into bits (e.g., a bitmap) that form a graphics frame for display. For example, surface information defines mathematically properties of each surface, including shape, size, color, layering order (i.e., which other surfaces it is in front or in back of), transparency, etc. The rendering engine of the OS can interpret the surface data to determine, at each location (e.g., "X, Y" location) in the rendering context, what bit to display as a function of rendering all the surface information (e.g., using iterative compositing, ray-tracing, and/or other techniques). The updated surfaces of the first application can be rendered, using the first rendering context, into a bitmap for storage into the first memory location (e.g., frame buffer memory, shared memory, or any other useful memory location).

In some embodiments, at block 1216, the first graphics frame is displayed from the first memory location to a display of a first computing environment associated with the first operating system. For example, a display driver for the mobile device display accesses associated frame buffer memory to display the bitmap generated in the first rendering context. At block 1220, the first rendering context is disestablished (e.g., "tom down").

At block 1224, a second rendering context of the first operating system is established. In some implementations, the second rendering context is identical to the first rendering context. However, the second rendering context may also be established according to characteristics of a display of the second computing environment (e.g., the desktop display). Updates to surfaces of the second application are calculated using the first operating system at block 1228. These updates are then rendered, at block 1232, in the second rendering context of the first operating system to generate a second graphics frame in a second memory location. Notably, the second memory location is a shared memory location accessible by both the first operating system and the second operating system, which are running concurrently on the shared kernel of the mobile device.

In some embodiments, at block 1236, the second graphics frame is displayed from the second memory location to a display of a second computing environment associated with the second operating system. It is worth noting that, unlike in FIG. 10, both applications' updated graphics frames are rendered using the first OS's rendering engine. For example, the console application of the second OS can access the second, shared memory location to directly retrieve a rendered bitmap for display to the second computing environment's display. At block 1240, the second rendering context is disestablished.

In some embodiments, the method 1200 iterates through the blocks to concurrently maintain the graphics environments for both applications. For example, the mobile OS iteratively establishes, uses, and tears down a rendering context for the first application; then establishes, uses, and tears down a rendering context for the second application. Using this technique, all the rendering can be performed by one OS (i.e., by the rendering engine of the first OS), and there is no need to provide or use rendering functionality of the other OS. However, the technique involves additional overhead associated with repeatedly establishing and tearing down rendering contexts.

The above embodiments of cross-environment rendering describe how a graphics frame for an application running on a first OS may be displayed within a console window of a user interaction space of a second OS in a multi-OS computing environment using non-extended rendering contexts. To support user interaction with such cross-environment applications, embodiments redirect input events from the user interaction space of the second OS to the first OS in such a way that cross-environment applications receive input events as if coming from the user interaction space of the first OS (i.e., the application receives the input events through the same event handlers and/or views through which it would receive user input if displayed within the user interaction space of the first OS).

Referring back to FIGS. 7 and 8, desktop OS 160 is configured to provide a second user interaction space through secondary terminal environment 840 suitable to a desktop computing experience. As described above, application 752 may be displayed within the user interaction space of mobile OS 130 while application 754, running on mobile OS 130, is displayed in console window 882 of the second user interaction space through console application 782 running on desktop OS 160 using embodiments of cross-environment rendering described above. Notably, applications 752 and 754 can be any applications compiled for mobile OS 130, running within the mobile OS runtime environment and accepting input events through the mobile OS framework without modification for being displayed or interacted with remotely (not on the user interaction space of mobile OS 130).

Figure 13:
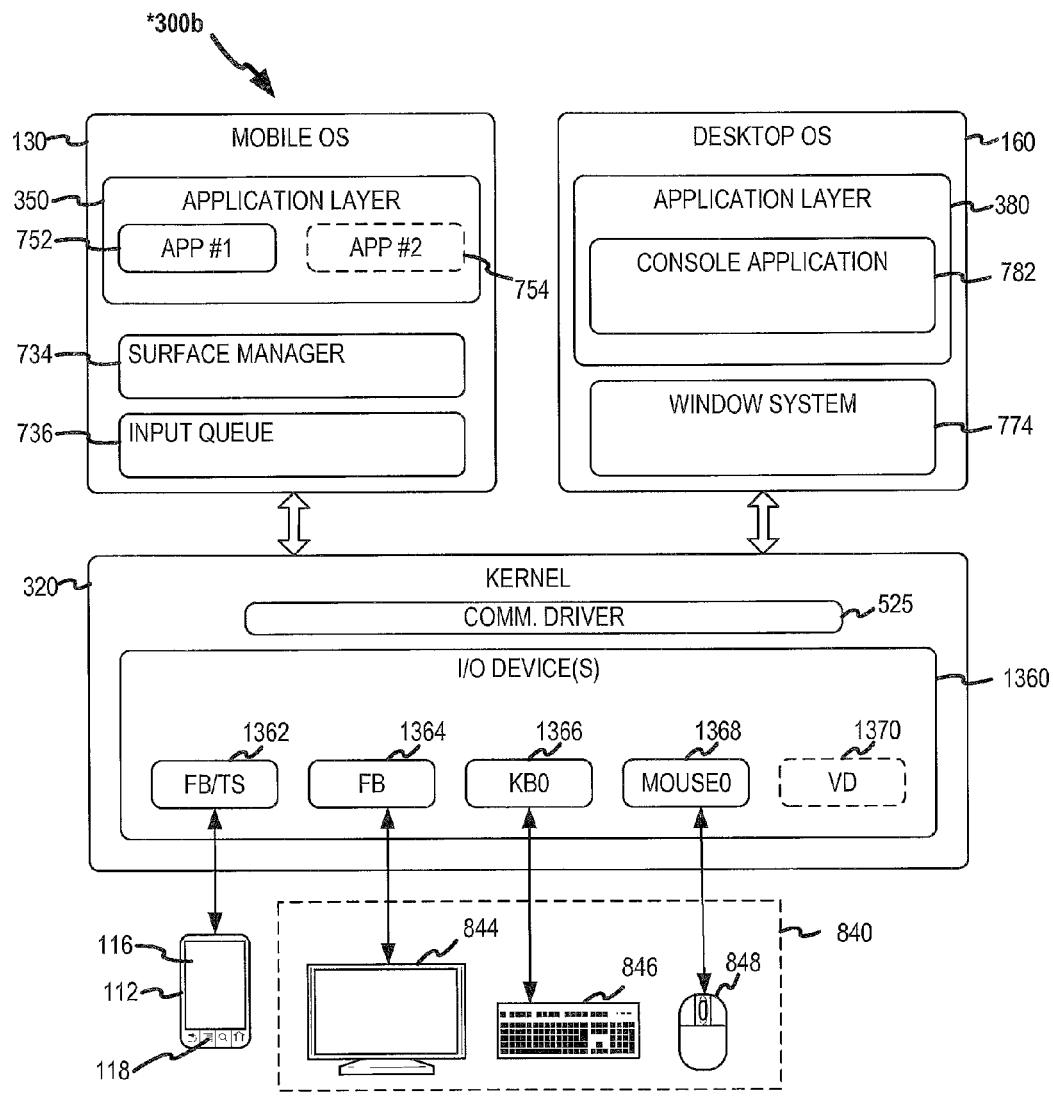
FIG. 13 illustrates operating system architecture configuration 300b for providing user interaction support to cross-environment applications, according to various embodiments.

FIG. 13 illustrates OS architecture configuration 300b for providing user interaction support to cross-environment applications, according to various embodiments. In OS architecture configuration 300b, device drivers in shared kernel 320 implement the hardware interfaces for I/O devices 844, 846, and/or 848 that make up secondary terminal environment 840. Through the device drivers, input events for these devices appear in devices 1364, 1366, and/or 1368 of I/O devices 1360 of shared kernel 320. Because system resources of shared kernel 320 are available to both mobile OS 130 and desktop OS 160, mobile OS determines whether input events on input devices 1364, 1366, and/or 1368 are intended for mobile OS 130. When desktop OS 160 is configured to provide a second user interaction space (i.e., mobile computing device 110 is docked to secondary terminal environment 840), mobile OS 130 ignores input events from input devices associated with the second user interaction space. In OS architecture configuration 300b, mobile OS 130 ignores input events from devices 1364, 1366, and/or 1368. In this instance, desktop OS 160 accepts input events from devices 1364, 1366, and/or 1368.

Desktop OS 160 processes input events from devices 1364, 1366, and/or 1368 and determines how to distribute the events to various windows or GUI elements within desktop OS 160. For example, window system 774 of desktop OS 160 may accept input events from devices 1364, 1366, and/or 1368. In one embodiment, the graphics system of desktop OS 160 is an X-windows graphics system.

In one instance, the user clicks a button of a pointing device at a screen location within console window 882 of console application 782. A corresponding input event appears in device 1368 and desktop OS 160 receives and processes the input event. Window system 774 directs the input event to console application 782 through which application 754, running on mobile OS 130, is displayed using embodiments of cross-environment rendering. As described above, application 754 is a mobile application and instantiates views and other event handlers using libraries of mobile OS 130 that receive input from the input queue 736 of mobile OS 130 to accept user input. To present the input event to application 754 in such a way that application 754 will properly interpret the input event, console application 782 maps the input event to the graphics context of mobile OS 130 and passes the event to the input queue 736 of mobile OS 130 through virtual input device 1370. Virtual input device 1370 appears to mobile OS 130 as an input device with the proper input event protocol for mobile OS 130. In addition, input events are formatted by console application 782 to be relative to the graphics context of mobile OS 130. Mobile OS 130 associates virtual input device 1370 with application 754 such that application 754 receives the input event from the mobile OS event queue. For example, mobile OS 130 may associate virtual input device 1370 with the virtual display ID of application 754. In this way, application 754 receives and processes the input event just as if application 754 was displayed and interacted with through the user interaction space of mobile OS 130.

Figure 14:
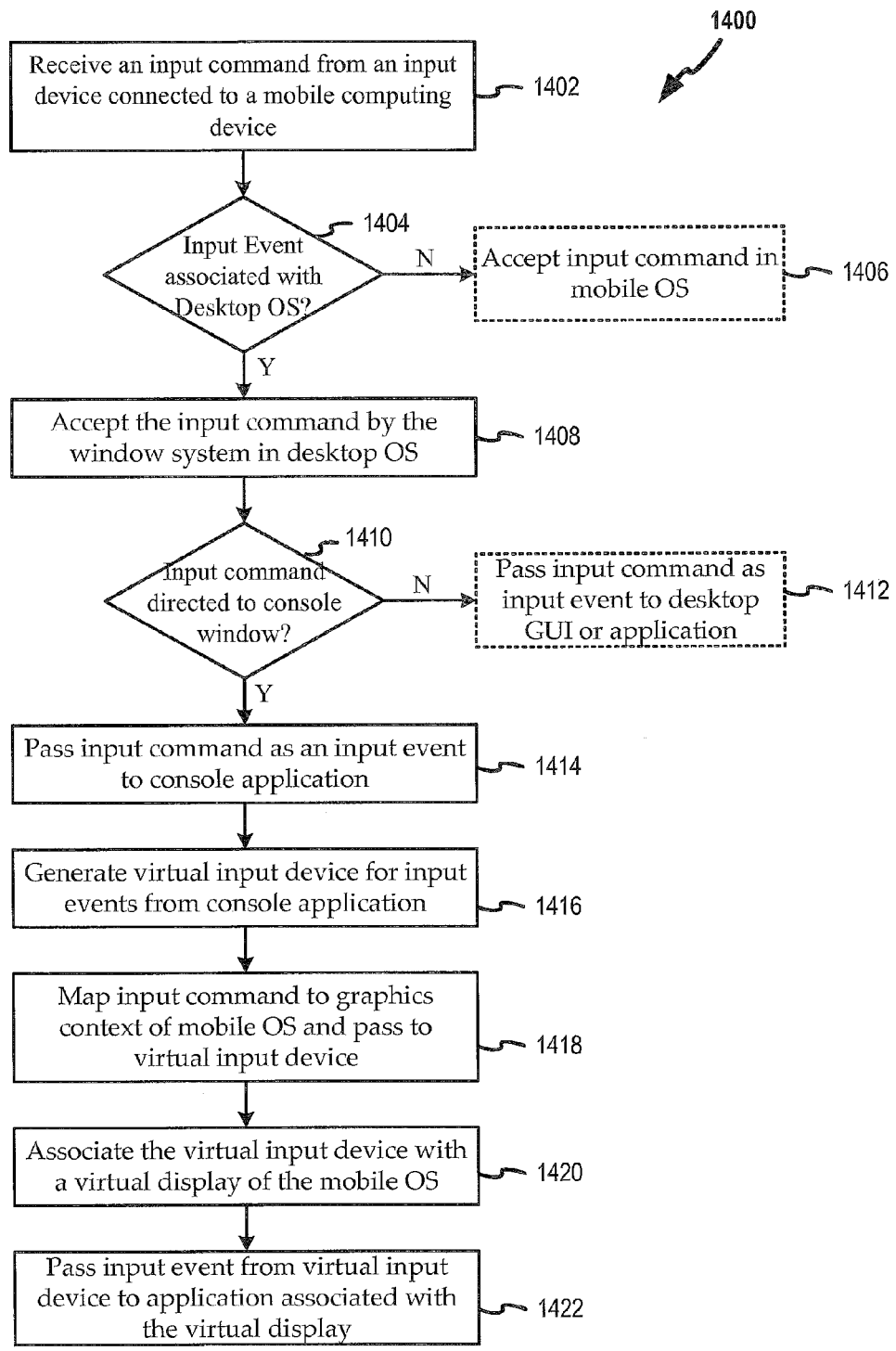
FIG. 14 illustrates aspects of user interaction support for cross-environment applications rendered using a non-extended graphics context, according to various embodiments.

FIG. 14 illustrates aspects of user interaction support for cross-environment applications rendered using a non-extended graphics context, according to various embodiments. The method 1400 begins at block 1402, when an input event is received from an input device (e.g., keyboard 846, pointing device 848) connected to mobile computing device 110. As described above, the input event may appear in an input device in the shared kernel. At block 1404, the mobile OS determines whether mobile computing device 110 is docked and the desktop OS is associated with the input device. For example, if mobile computing device 110 is not docked with a secondary terminal environment and the desktop OS is suspended, the mobile OS may determine that the desktop OS is not associated with the input device. If the desktop OS is suspended or the input device is not part of a secondary terminal environment associated with the desktop OS, the mobile OS accepts the input command from the input device at block 1406.

If the desktop OS is not suspended and the input device is part of a secondary terminal environment associated with the desktop OS, the mobile OS ignores the input event on the input device and the desktop OS accepts the input event at block 1408. At block 1410, the desktop OS distributes the input event to the appropriate window or GUI element within the desktop OS. If the input event is not directed to the console window, the input event is directed to another window or GUI element at block 1412. If the input event is directed to the console window (e.g., the user clicks a pointing device within the console window area), the input event is passed to the console application as an input event at block 1414.

At block 1416, a virtual input device is generated for input events from the console application. The virtual input device may be generated in the shared kernel or input events may be written directly into the mobile OS input devices. At block 1418, the console application maps the input event to the graphics context of the mobile OS. For example, the console application may map the position of an input event within the console window of the console application to the position within the graphics context of the mobile OS. The console application may translate the input event for an input format or input mode state for the mobile OS. For example, an input format may be different between the desktop OS and the mobile OS. Even with common input formats, the desktop OS and mobile OS may have different input mode states. For example, the desktop OS may be processing input events using a non-touch mode input state while the mobile OS is in a touch mode input state. In this instance, an input event generated by a pointing device in the desktop OS user interaction space may be translated to appear as a gesture-based event in the virtual input device.

At block 1420, the virtual input device is associated in the mobile OS with the virtual display device for the application displayed within the console window. For example, multiple applications may be running on the mobile OS and displayed within different console windows on the user interaction space of the desktop OS. Each application displayed within a separate console window in the user interaction space of the desktop OS is assigned a virtual display ID within the mobile OS. Therefore, when the mobile OS receives an input event from a console application of the desktop OS through a virtual device, the mobile OS can map the virtual device to the correct application through the virtual display ID. At block 1422, the input event is passed to the application associated with the virtual display and the application can process the input event as if it occurred through a user interaction space of the mobile OS. Notably, the above method works with any application of mobile OS 130, the application does not need to be specially designed to accept input events through the console application of the desktop OS.

Extended Rendering Context Embodiments

Some embodiments handle concurrent user interface support across multiple OSs by establishing extended rendering contexts within the first operating system. As discussed above, the first OS (e.g., the mobile OS, Android) is typically configured to define a single, active user interaction space with a single active rendering context. Novel techniques are described herein for effectively fooling the first OS into concurrently handling multiple user interaction spaces by tiling a number of so-called "context spaces" into a single, extended rendering space and associating each context space with a different display. Embodiments include techniques for handling the display outputs to multiple user interaction spaces and techniques for handling the user interaction in those contexts.

Returning to the example discussed above with reference to the non-extended rendering context embodiments, suppose again that a calendar application and a word processing application are both compiled for a first OS (e.g., mobile OS, Android OS) and are both running concurrently within the first OS on a mobile device. A second OS (e.g., a non-mobile OS, like Hydroid) is running concurrently on the mobile device using a shared kernel. A user has docked the mobile device with a second, desktop computing environment, and the desktop computing environment is associated with and displaying the user interaction space for the second as. The user desires to interact with the word processing application, running on the first as, through the desktop computing environment of the second OS. It is desirable to handle the user interaction space of the desktop computing environment using the second OS of the mobile computing environment (i.e., the mobile device) in a way that is transparent to the user.

Figure 15:
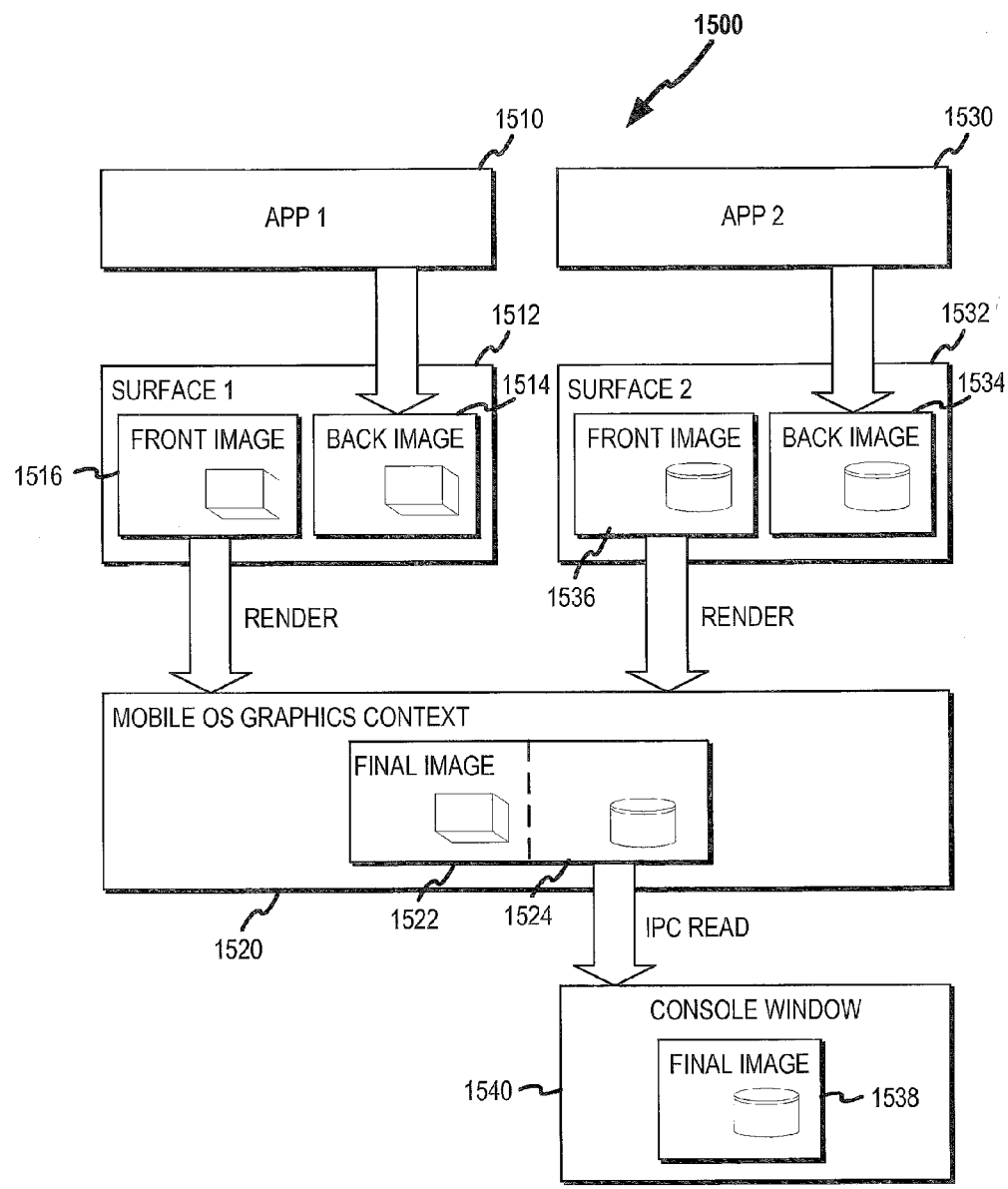
FIG. 15 illustrates aspects of concurrent user interface support across multiple OSs using extended rendering contexts, according to various embodiments.

FIG. 15 illustrates aspects of concurrent user interface support across multiple OSs using extended rendering contexts, according to various embodiments. In application rendering diagram 1500 illustrated in FIG. 15, the first application 1510 (e.g., calendar application) calculates updates for a first surface 1512 within the first OS. The first surface 1512 is stored in a first memory location in a shared memory space by the first OS. Specifically, the first application 1510 updates the back buffer 1514 of the first surface 1512. Similarly, the second application 1530 (e.g., word processing application) calculates updates for a second surface 1532 using the first operating system. Again, the updates by the second application 1530 to the second surface 1532 are made to the back buffer 1534. The second surface 1532 is stored in a second memory location in the shared memory space by the first OS.

The first OS determines when surface information is changed and initiates a rendering sequence. The first OS may perform a single loop over all surfaces, including the first surface 1512 and second surface 1532, determining when surface information associated with particular applications has changed. In the rendering sequence, the first OS determines when surface information is changed and swaps the front buffer 1516 and back buffer 1514 of the first surface 1512, and the front buffer 1536 and back buffer 1534 of the second surface 1532. The first OS establishes an extended rendering context 1520 in a third memory location in a shared memory space and renders the first surface 1512 into a first context space 1522 of the extended rendering context 1520. The first OS renders the second surface 1533 into a second context space 1524 of the extended rendering context 1520.

In embodiments, the extended rendering context 1520 may overlap in memory space with the frame buffer of the first OS. For example, the memory location of the first context space 1522 of the extended rendering context 1520 may be coextensive with the frame buffer of the first OS. The first OS passes a notification to the second OS that the final image is rendered at the third memory location. For example, the first OS may pass a file descriptor to the shared memory location of the second context space 1524 of the extended context 1520 to a console application of the second OS through an inter-process communication channel. The second OS accesses the second portion of the extended graphics context at the third memory location to retrieve the rendered graphics frame 1538 for display in the console window 1540 of the second OS. For example, the console application of the second OS may map the file descriptor to its process space and read the rendered graphics frame from the third memory location for display within the user interaction space of the second OS. In this way, the second OS displays the rendered graphics frame for the second application within its user interaction space in real-time.

Figure 16:
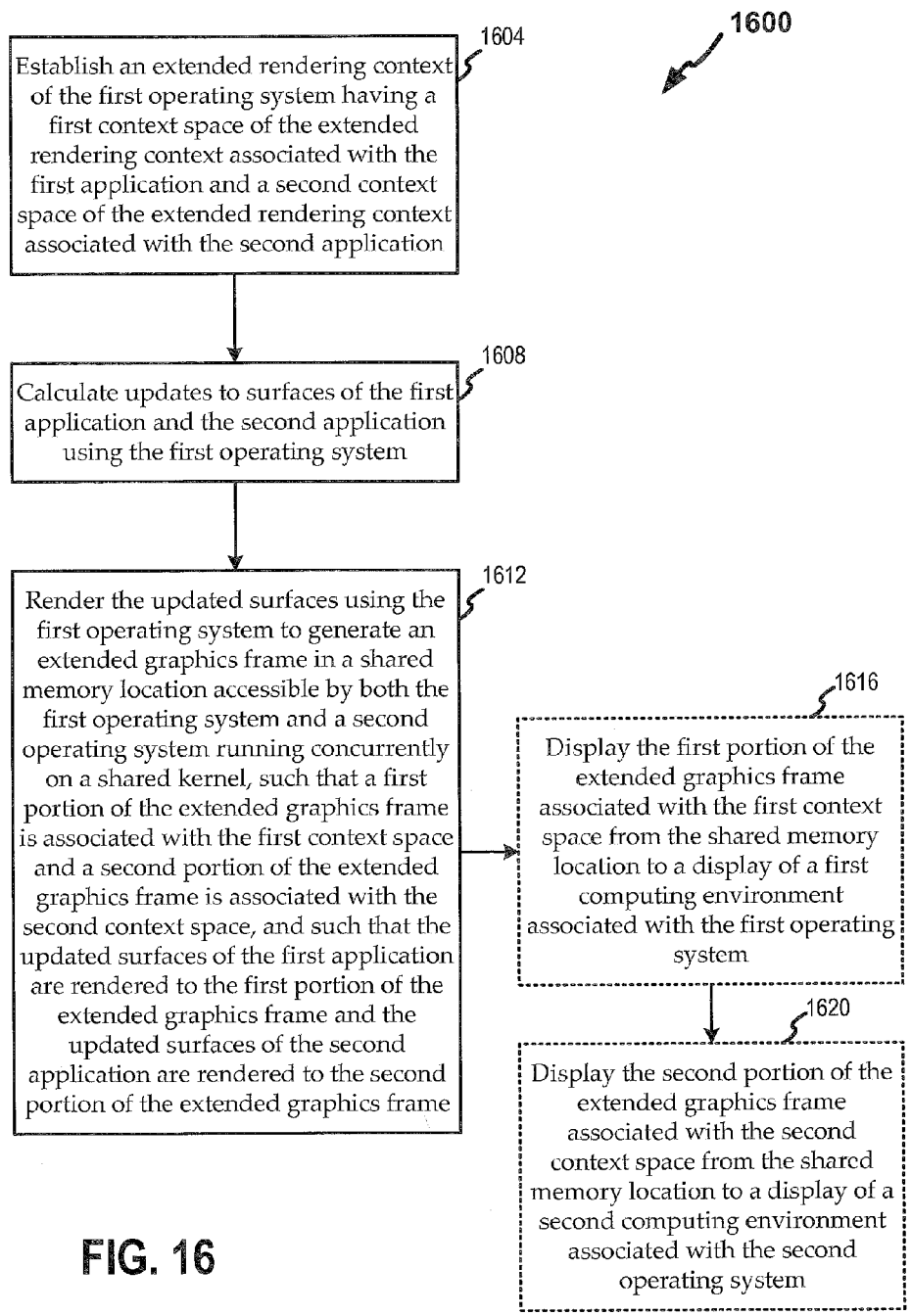
FIG. 16 shows a flow diagram of an illustrative method for cross-environment remote rendering in an extended rendering context, according to various embodiments.

FIG. 16 shows a flow diagram 1600 of an illustrative method for cross-environment rendering using an extended rendering context, according to various embodiments. Embodiments maintain display of application graphics for a first application (e.g., a calendar application) and a second application (e.g., a word processing application). It is assumed that both applications are compiled for and in active concurrent execution within a first operating system (e.g., the Android OS), but that a user desires to interact with the second application through a second computing environment associated with a second OS. Notably, these techniques can be applied in environments where the two OSs are incompatible (e.g., applications compiled for the first OS could not be directly executed on the second OS). In some implementations, as described above, the two OSs are running independently and concurrently on a shared kernel of the mobile device.

The method 1600 begins at block 1604 by establishing an extended rendering context of the first OS. As discussed above, the rendering context is typically established according to characteristics of a single, active display. However, the extended rendering context is established to have a first context space associated with the first application and a second context space associated with the second application. The first and second context spaces are non-overlapping.

In some embodiments, the extended rendering context is generated by tiling the active display of the local device (e.g., the display of the mobile device having the shared kernel) and any virtual displays (i.e., displays of the first OS associated with console windows displayed within the user interaction space of the second OS) to form what looks to the first OS to be one, large display. Regions of the extended rendering context are designated as non-overlapping context spaces to maintain their association with their respective physical or virtual displays. Notably, in some implementations, different context spaces may have different resolutions or other characteristics. Also, in certain embodiments, context spaces are not contiguous. For example, the extended rendering context is established in such a way that space is left between each context space that is not assigned to any context space.

At block 1608, updates are calculated to surfaces of the first application and the second application using the first operating system. The updated surfaces are then rendered using the first operating system, at block 1612, to generate an extended graphics frame in a shared memory location accessible by both the first operating system and a second operating system (e.g., which may be running concurrently on a shared kernel). A first portion of the extended graphics frame is associated with the first context space (associated with the first application) and a second portion of the extended graphics frame is associated with the second context space (associated with the second application. When the rendering occurs at block 1608, the updated surfaces of the first application are rendered to the first portion of the extended graphics frame, and the updated surfaces of the second application are rendered to the second portion of the extended graphics frame. It is worth noting that, in this way, the extended graphics frame effectively includes rendered surfaces of both applications tiled into their appropriate context spaces.

In some embodiments, at block 1616, the first portion of the extended graphics frame associated with the first context space is displayed from the shared memory location to a display(s) of a first computing environment associated with the first OS. For example, as discussed above, the shared memory location is frame buffer memory (or is copied to frame buffer memory) of the mobile device, and a display device driver of the mobile device accesses the frame buffer memory to display the first portion of the extended graphics frame to its display(s). Further, in some embodiments, the second portion of the extended graphics frame associated with the second motion space is displayed, at block 1620, from the shared memory location to a display of a second computing environment associated with the second operating system. For example, as discussed above, the shared memory location is copied to frame buffer memory of the second OS associated with the second (e.g., desktop) computing environment, and a display device driver displays the second portion of the extended graphics frame to a display of the second computing environment.

In embodiments discussed with reference to FIG. 12, rendering for the second application's updated graphics is performed remotely by the second OS. In embodiments discussed with reference to FIG. 15, rendering for both applications is performed locally by the rendering engine of the mobile device, but the rendering context is continually established and disestablished. The embodiments discussed with reference to FIG. 16 allow rendering for both applications to be performed locally by the rendering engine of the mobile device, while maintaining a single, albeit extended, rendering context (i.e., without disestablishing the rendering context).

Figure 17:
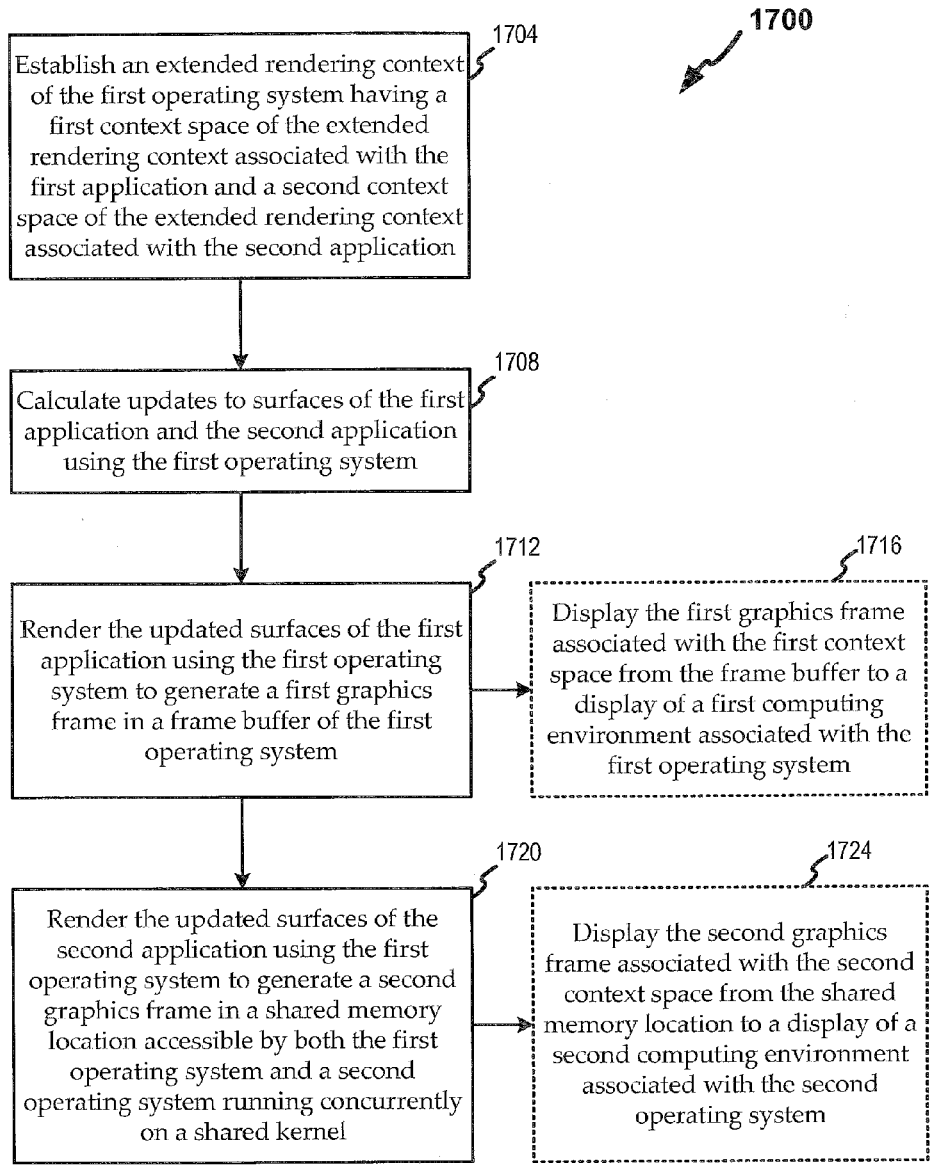
FIG. 17 shows a flow diagram of another illustrative method for cross-environment rendering in an extended rendering context, according to various embodiments.

FIG. 17 shows a flow diagram 1700 of another illustrative method for cross-environment rendering using an extended rendering context, according to various embodiments. As in the method 1600 of FIG. 16, embodiments maintain display of application graphics for a first application and a second application that are both compiled for and in active concurrent execution within a first operating system. The method 1700 begins by establishing an extended rendering context of the first operating system at block 1704 and calculating updates to surfaces of the first application and the second application using the first operating system at block 1708. As discussed above, the extended rendering context is established to have a first context space associated with the first application and a second context space associated with the second application. The first and second context spaces are non-overlapping. In some implementations, blocks 1704 and 1708 are performed in a substantially identical manner to blocks 1604 and 1608, respectively.

At block 1712, the updated surfaces of the first application are rendered according to the first context space using the first operating system to generate a first graphics frame in a frame buffer of the first operating system. For example, the first context space may be associated with a particular resolution, particular tiling offsets (e.g., starting "X" position), etc. In some implementations, the first graphics frame is generated in a substantially identical manner to generation of the respective portion of the extended graphics frame in the method 1600 of FIG. 16. In some embodiments, at block 1716, the first graphics frame associated with the first context space is displayed from the frame buffer to a display of a first computing environment associated with the first operating system.

At block 1720, the updated surfaces of the second application are rendered using the first operating system to generate a second graphics frame in a shared memory location. As discussed above, the shared memory location is accessible by both the first operating system and a second operating system (e.g., which may be running concurrently on a shared kernel). In some embodiments, at block 1724, the second graphics frame associated with the second motion space is displayed from the shared memory location to a display of a second computing environment associated with the second operating system.

Notably, the embodiments of both FIGS. 16 and 17 establish extended rendering contexts with context spaces for each application. However, while the method 1600 of FIG. 16 renders all the graphics updates into a single extended bitmap, the method 1700 of FIG. 17 renders the graphics updates into separate bitmaps. One or the other technique may be desirable, for example, depending on how memory is being managed and/or accessed.

As with the embodiment of FIG. 12, in the embodiments of FIGS. 16 and 17 both applications' updated graphics frames are rendered using the first OS's rendering engine. Using the first OS's rendering engine allows both applications to use hardware acceleration capabilities of the mobile device that are available in the first OS. For example, in the embodiments of FIGS. 12, 16, and/or 17, either or both of the first and the second application may be rendered by the First OS using 2D or 3D hardware-assisted rendering.

Remote display of a graphics frame for an application running on a first OS (i.e., mobile OS, Android) using an extended rendering context provides a way for the first OS to provide rendering for multiple applications for display within multiple user interaction spaces using a single rendering context. However, an extended rendering context creates issues for handling input events for applications displayed through the extended rendering context. Specifically, the input queue of the first OS must be configured to handle multiple input events from multiple applications displayed through separate virtual displays of an extended rendering context.

Embodiments of cross-environment user interaction support are directed to handling user input events for multiple applications running on a first OS and displayed on multiple separate user interaction spaces (i.e., the mobile device user interaction space and a desktop OS user interaction space) through an extended rendering context of the first OS. Embodiments include an extended input queue where input events from virtual input devices for remotely displayed applications are mapped to separate motion spaces within the input queue. For example, a first application (e.g., calendar application) is running on a first OS and is being displayed to a first display associated with the first device (e.g., the display of the mobile device on which the first OS is running). A second application (e.g., word processing application) is also running concurrently with the first application, but is rendered within a context space (i.e., virtual display) of the extended rendering context and displayed on a second user interaction space of a second OS running concurrently with the first OS on a shared kernel of a mobile device. The first OS renders a graphics frame through an extended rendering context that includes both application graphics for the first application in the first context space (i.e., the mobile device display) and the second application in the second context space. The second context space is displayed on a user interaction space of the second OS through a console application running on the second OS.

Input events for applications displayed remotely through an extended rendering context are received by the second OS (i.e., desktop OS, Hydroid) and passed to a virtual input device by the console application of the second OS in the same manner as described above for non-extended graphics contexts. However, as described above, the input events received in the mobile OS from the virtual input device are relative to the console window displayed within the user interaction space of the second OS. Virtual input devices are mapped to motion spaces within the extended input queue that are associated with virtual displays corresponding to remotely displayed applications. The extended input queue allows the first OS to correctly process input from multiple local and virtual input devices intended for multiple concurrently executing applications using a single input queue.

Figure 18A:
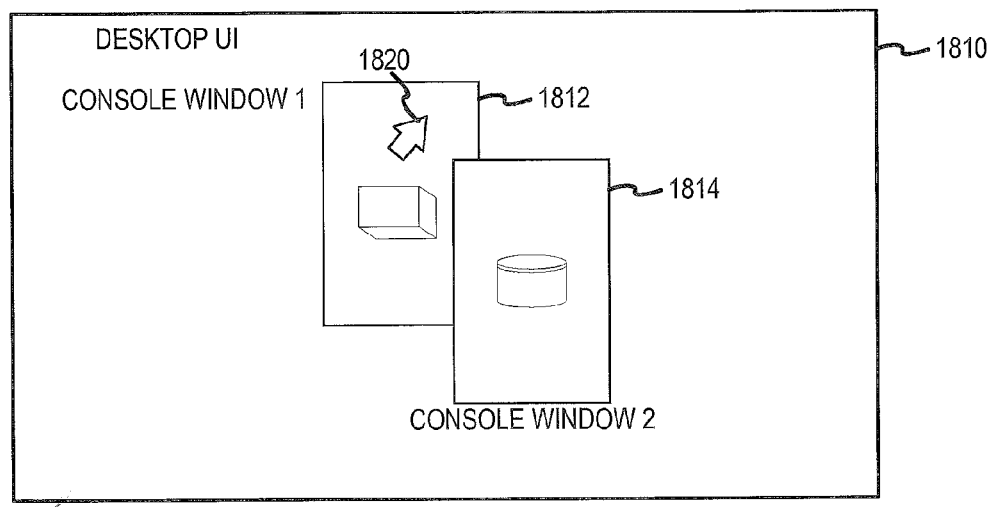
FIG. 18a illustrates a user environment that may be employed in cross-environment rendering, in an extended rendering context, according to various embodiments.
Figure 18B:
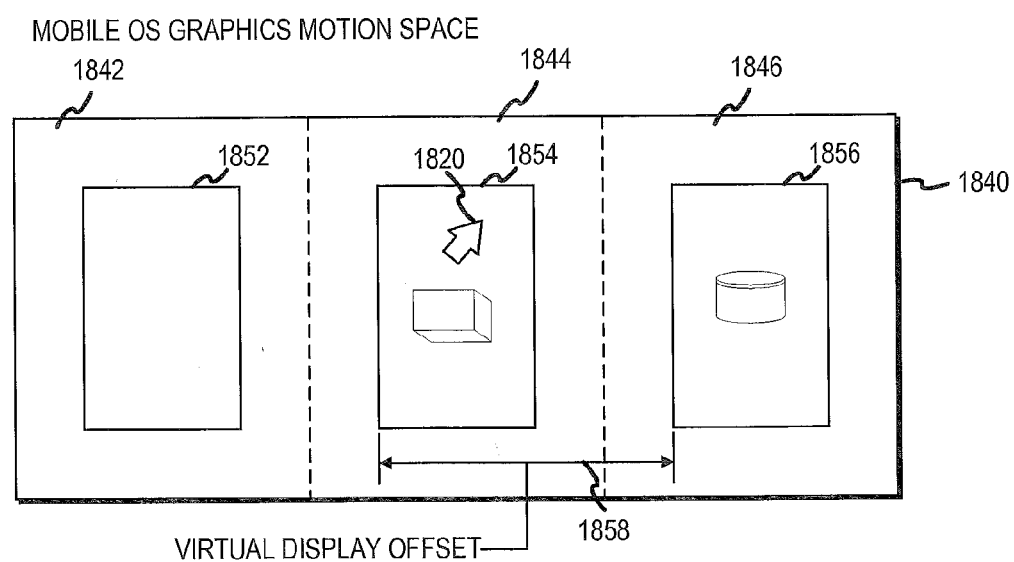
FIG. 18b illustrates an extended input queue that may be employed in cross-environment rendering, in an extended rendering context, according to various embodiments.

FIGS. 18*a* and 18*b* illustrate aspects of user interaction support for cross-environment applications using an extended rendering context, according to various embodiments. FIG. 18*a* illustrates a user interaction space 1810 that is remotely displaying applications running on a first OS (e.g., the GUI of the second OS displaying applications running in the first OS). For example, first, second, and third applications may be running on the first OS (i.e., in active concurrent execution with the first OS). The first OS may display the first, second, and third applications within a first, second, and third context space of an extended rendering context of the first OS according to embodiments described above. Console windows 1812 and 1814 in user interaction space 1810 may be displaying the second application and the third application running in the first OS, respectively.

FIG. 18*b* illustrates an extended input queue 1840 of the first OS that provides user interaction support for each application running on the first OS. The extended input queue 1840 includes a first motion space 1842, a second motion space 1844, and a third motion space 1846. The first motion space is associated with the first context space of the extended rendering context of the first OS, which is typically used to render a non-virtual display 1852 of the first OS (i.e., the context space associated with display(s) 116 of mobile computing device 110). The second and third motion spaces are associated with virtual displays 1854, 1856, which are rendered through the second and third context spaces, respectively.

When an input event occurs that is directed to a console window of a remotely displayed application, the input event is directed to the motion space associated with the virtual display through which the application is displayed. For example, if the user clicks with a pointing device within console window 1812 of user interaction space 1810, as indicated by input event 1820, the window system of the second OS directs the input event to the console application associated with console window 1812. The console application maps the input event to a virtual input device as described above. However, the input event is relative to the console window 1812. If the input event is fed directly to the input queue of the first OS, the input event would not be directed to the correct application event handler. Therefore, the input event 1820 from the virtual input device is remapped to the second motion space 1844. In this way, the extended input queue directs the input event to event handlers of the second application which receive and process the input event 1820.

In embodiments, virtual displays are offset within the mobile OS input queue. For example, in FIG. 18*b*, virtual displays 1854 and 1856 are offset by virtual display offset 1858 within the mobile OS input queue 1840. Virtual display offset 1858 prevents virtual displays from appearing adjacent within the input queue, which may cause an input event intended for one virtual display from being interpreted within a motion space associated with a different application. The virtual display offset should be large enough never to be used as an actual virtual display resolution parameter. In one embodiment, virtual display offset 1858 is selected to be 10000 pixels.

Figure 19:
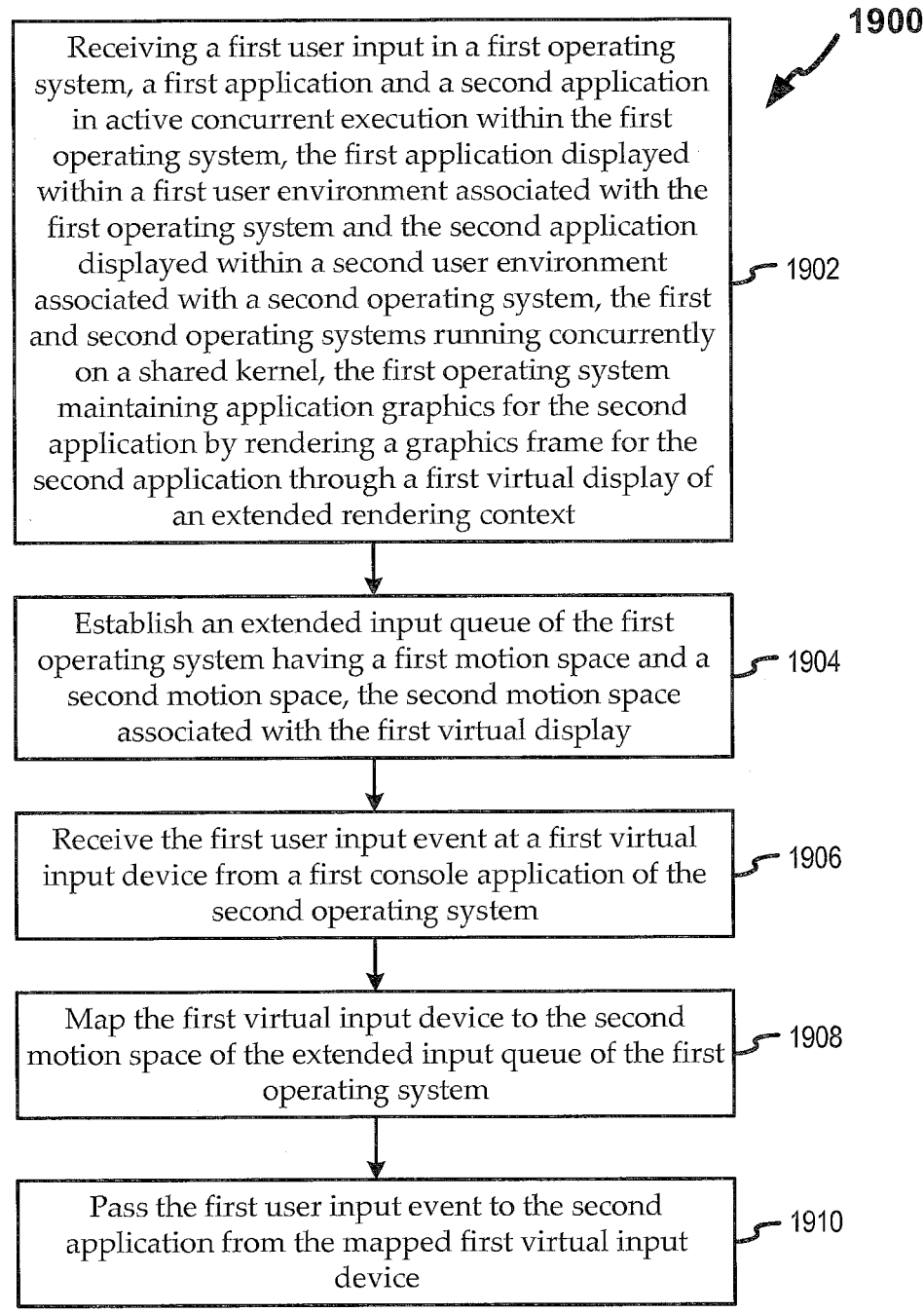
FIG. 19 illustrates a method for receiving input events that may be employed in cross-environment rendering, in an extended rendering context, according to various embodiments.

FIG. 19 illustrates a method 1900 for receiving input events for cross-environment applications displayed through an extended rendering context, according to various embodiments. For example, method 1900 may be used to process input events for a first application and a second application running within a first OS, the first application displayed locally on the user interaction space of the first OS and the second application displayed remotely in a user interaction space of a second OS through an extended rendering context of the first OS.

Method 1900 begins at block 1902, when a first user input is received in a first OS, a first application and a second application in active concurrent execution within the first OS, the first application displayed within a first user environment associated with the first OS and the second application displayed within a second user environment associated with a second OS, the first and second operating systems running concurrently on a shared kernel, the first OS maintaining application graphics for the second application by rendering a graphics frame for the second application through a first virtual display of an extended rendering context. At block 1904, the first OS establishes an extended input queue that includes a first motion space and a second motion space, the second motion space corresponding to the first virtual display. For example, the first operating system allocates the first virtual display for the second application, establishes an extended rendering context having a first context space and a second context space, associates the first virtual display with the second context space, and renders a graphics frame for the second application through the second context space of the extended rendering context using the techniques described above.

At block 1906, a first user input event is received by the first OS at a first virtual input device from a first console application running in the second OS that is displaying the rendered graphics frame for the second application through the second OS. At block 1908, the first virtual input device is mapped to the second motion space of the extended input queue of the first operating system. Mapping the first virtual input device to the second motion space allows the extended input queue of the first OS to correctly associate input events from the first virtual input device to event handlers within views of the second application. Specifically, when the input event is mapped to the second motion space, the first OS will treat the input event as occurring at a location associated with the second application in the extended input queue. At block 1910, the first OS passes the first user input event to the second application from the mapped first virtual input device. The extended input queue uses the tiled nature of the extended rendering context to enable the input queue to handle multiple input events from multiple user interaction spaces and direct the input events to the appropriate event handlers of the intended applications.

Mirrored Context Embodiments

Embodiments of the extended and non-extended rendering contexts are described above in the context of maintaining concurrent user interaction space support across multiple applications over multiple operating systems. In many instances, it is desirable to mirror the context for a single user interaction space. It is desired to view and interact with the first OS (i.e., to "mirror" the interaction space) concurrently in a second computing environment associated with a second OS (e.g., a desktop environment associated with Hydriod OS). Through the mirrored user interaction space, the user can interact with the first OS as if interacting through the local device (i.e., the user can browse available applications, start and stop applications, use the search capabilities of the first OS, etc.).

The first OS (e.g., the mobile OS, Android) is typically configured to define a single, active user interaction space. The user interaction space includes an active display (e.g., with associated characteristics, like resolution) and one or more active input devices for allowing user interaction with the elements displayed on the active display. Novel techniques are presented for using cross-environment rendering to provide one or more mirrored user interaction spaces across multiple OSs. As discussed above, embodiments operate even where the multiple OSs are incompatible and/or are running independently and concurrently on a shared kernel.

Maintaining concurrent user interaction support with a mirrored context may be accomplished using many of the same system elements referred to above with regard to maintaining concurrent user interaction support for cross-environment applications. For example, referring to FIG. 7, the graphics context for mobile OS 130 may be actively displaying an application (e.g., applications 752 and/or 754) and/or a home screen of the mobile OS 130 (e.g., home screen application 451 of Android OS 430). Surface information for an actively displayed application and/or the home screen of the mobile OS may be stored within shared memory 724. The mirrored context for mobile OS 130 may be displayed within the user interaction space of desktop OS 160 through console application 782.

Figure 20:
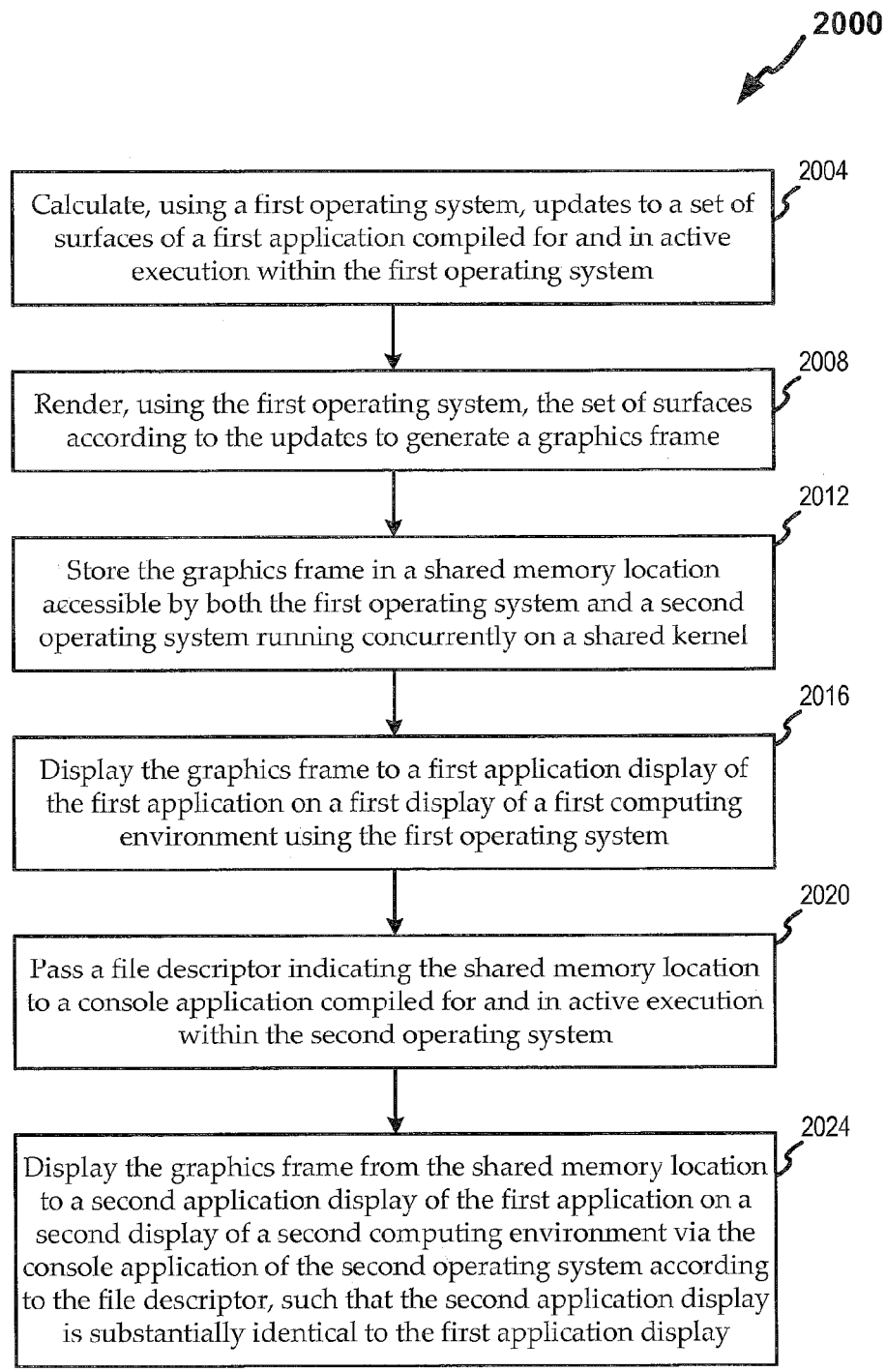
FIG. 20 shows a flow diagram of an illustrative method for cross-environment rendering to provide a mirrored context, according to various embodiments.

FIG. 20 shows a flow diagram 2000 of an illustrative method for cross-environment rendering of a graphics context to provide a mirrored user interaction space, according to various embodiments. The method 2000 begins at block 2004 by calculating, using a first operating system, updates to a set of surfaces of a first application compiled for and in active execution within the first operating system. For example, calculations are made to determine changes in surface shapes, sizes, textures, layering, etc. The surface updates are then rendered at block 2008, using the first operating system, to generate a graphics frame. The graphics frame may be a bitmap that reflects the updated graphics information for the application.

At block 2012, the graphics frame is stored in a shared memory location accessible by both the first operating system and a second operating system. In some embodiments, the first and second OS are running concurrently on a shared kernel. The graphics frame may be displayed to a first application display of the first application on a first display of a first computing environment using the first operating system at block 2016. For example, the shared memory location may be frame buffer memory or may be copied to a frame buffer of the first operating system. A display device driver of the local device (e.g., which is running the shared kernel) accesses the frame buffer memory to display the bitmap.

Subsequent to storing the graphics frame in the shared memory location at block 2012, it is desirable to inform the second OS that the updated graphics information is available. At block 2020, a file descriptor is passed, indicating the shared memory location to a console application compiled for and in active execution within the second OS. In some implementations, the file descriptor includes an indication of the shared memory location. In other implementations, the file descriptor includes additional information, like a flag indicating availability of updated graphics information for the application being mirrored.

As described above, the console application may be an X-Windows or similar type of application that is displayed within a window of a display in the second computing environment. At block 2024, the console application accesses the updated graphics information (e.g., the bitmap) at the shared memory location according to the file descriptor and displays the graphics frame from the shared memory location to a second application display of the first application on a second display of a second computing environment. In some embodiments, the updated graphics information of the application is displayed substantially concurrently on the displays of both the first and second computing environments.

Figure 21:
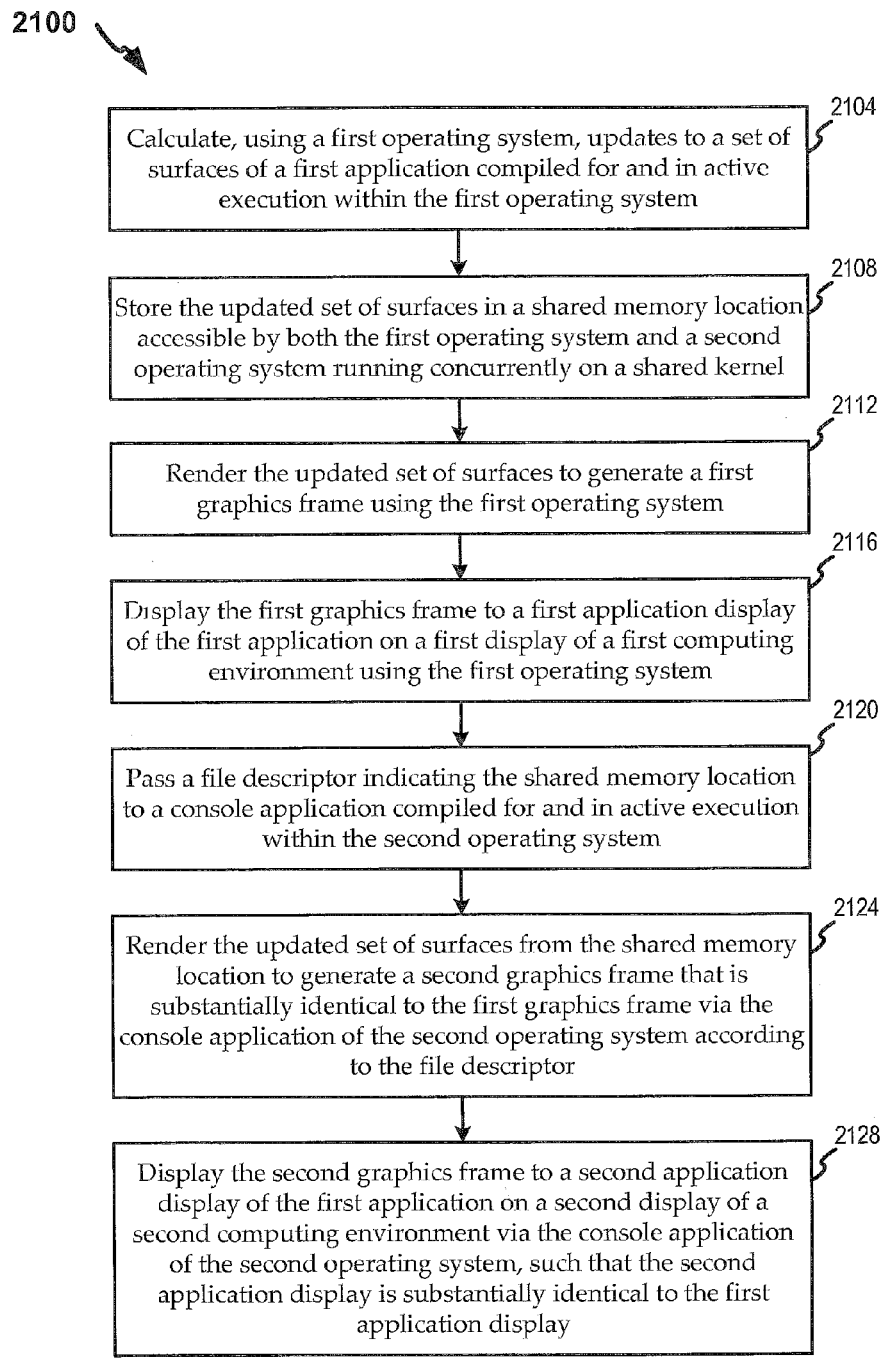
FIG. 21 shows a flow diagram 2100 of another illustrative method for cross-environment rendering to provide a mirrored context, according to various embodiments.

FIG. 21 shows a flow diagram 2100 of another illustrative method for cross-environment rendering of a graphics context to provide a mirrored user interaction space, according to various embodiments. As in FIG. 20, the method 2100 begins at block 2104 by calculating, using a first operating system, updates to a set of surfaces of a first application compiled for and in active execution within the first operating system. At block 2108, the updated set of surfaces is stored in a shared memory location accessible by both the first operating system and a second operating system (e.g., running concurrently on a shared kernel).

At block 2112, the updated set of surfaces is rendered with the first operating system to generate a first graphics frame. The first graphics frame can then be displayed, at block 2116, to a first application display of the first application on a first display of a first computing environment using the first operating system. For example, the mobile OS 130 renders the updated application graphics and displays the updated graphics to the display(s) 116 of the mobile device 110.

At any time subsequent to storing the updated set of surfaces in shared memory in block 2108, it is desirable to notify the second OS that the updated graphics information is available. At block 2120, a file descriptor is passed indicating the shared memory location to a console application compiled for and in active execution within the second operating system. Notably, the information stored in the shared memory is unrendered surface information (e.g., geometric primitives) rather than rendered bits as in the method 2000 of FIG. 20.

Accordingly, at block 2124, the updated set of surfaces is rendered by the second operating system (e.g., via the console application according to the file descriptor) from the shared memory location to generate a second graphics frame that is substantially identical to the first graphics frame. At block 2128, the second graphics frame is displayed to a second application display of the first application on a second display of a second computing environment via the console application of the second operating system, such that the second application display is substantially identical to the first application display.

It is worth noting that additional overhead may be involved in replicating the rendering on both the first and second operating systems. However, this additional overhead may be worthwhile in a number of circumstances. For example, where the displays of the different computing environments have appreciably different characteristics, it may be desirable to render updated graphics information in separate rendering contexts that are each suited for a respective one of the displays.

The methods of FIGS. 20 and 21 describe cross-environment mirroring of a graphics context with active display of an application running in the first OS within the mirrored graphics context. However, the methods may be used where no application is actively displayed within the graphics context. For example, the graphics context may be displaying a home screen or other feature (e.g., search screen, etc.) of the first OS. In these instances, the surface information for the graphics context is updated by a component of the first OS, and the other steps of the methods of FIGS. 20 and 21 may be performed to provide the mirrored graphics context in the second application display.

Notably, cross-environment mirroring of a graphics context may be employed 10 concurrently with cross-environment rendering of an application. For example, a method according to FIG. 20 or 21 may be used to mirror the active graphics context of the user interaction space of the mobile device to a second user environment at the same time that an application running on the first OS is displayed within the second user environment using the techniques for cross-environment rendering of an application described above. Referring to FIG. 8 for the sake of illustration, the user interaction space of the mobile OS may be displayed within a first console window 882 while a mobile OS application is displayed within a second console window 884 within the user interaction space of the desktop OS on display 844.

Providing user interaction support for a mirrored graphics context may be performed in substantially the same way as providing user interface support for a cross-environment application illustrated in FIGS. 13, 14, 18, and/or 19. Specifically, input events may be provided from a console application of the second OS to a virtual input device. The first OS may accept input events from the virtual input device through an extended or a non-extended input queue.

Cross-Environment Redirection Embodiments

The techniques described above provide cross-environment user interaction support for applications and graphics contexts of a first operating system through a user interaction space of a second operating system. To facilitate a transparent cross-environment use model, embodiments are directed to providing access to applications and/or mirrored contexts of a first operating system from the user interaction space of the second operating system.

Referring back to FIG. 8, a user may interact with a first OS (i.e., mobile OS, Android) through a first user interaction space that includes the interaction components (i.e., touch screen display(s) 116, other I/O device(s) 118) on the mobile device. The user may also interact with a second OS (i.e., desktop OS, Hydroid) through a second user interaction space including a display 844 of secondary terminal environment 840. As described above, the set of applications available for (i.e., compiled for and loaded within the execution environment of) desktop OS 160 may be different than that available for mobile OS 130. Embodiments are directed to making applications of mobile OS 130 accessible within the user interaction space of desktop OS 160 by providing menu icons or menu list items within menus of the user interaction space of desktop OS 160 for applications available on mobile OS 130.

Figure 22:
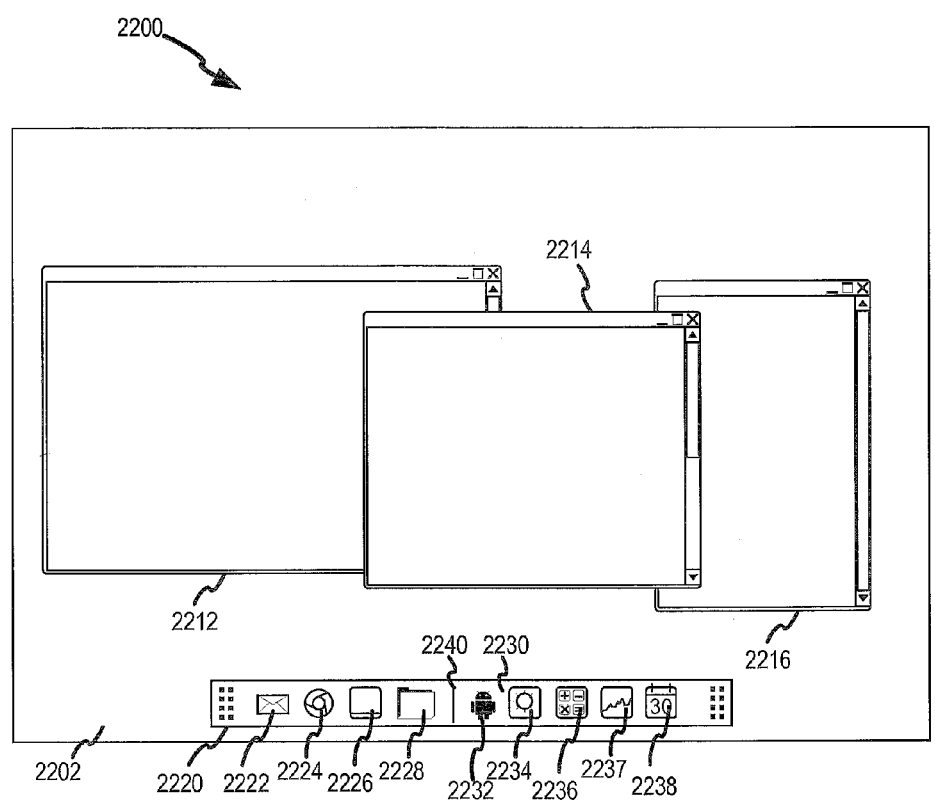
FIG. 22 illustrates aspects of cross-environment redirection, according to various embodiments.

FIG. 22 illustrates aspects of cross-environment redirection, according to various embodiments. Within computing environment 2200 illustrated in FIG. 22, a user interacts with desktop OS 160 through desktop OS user interaction space 2202. Within desktop OS user interaction space 2202, menu bar 2220 includes icons or lists of available applications. To launch an application, the user selects the application name or icon from the menu bar or from dropdown or pop-up-lists of menu bar 2220. Traditionally, menu bar 2220 includes only menu items or icons for applications available on desktop OS 160. For example, menu items 2222, 2224, 2226, and/or 2228 may be applications available on (i.e., compiled for and loaded within the execution environment of) desktop OS 160. Embodiments of the invention are directed to providing cross-environment access to applications and/or the graphics context of mobile OS 130 from desktop OS user interaction space 2202. For example, menu items 2232, 2234, 2236, 2237, and/or 2238 may indicate applications available on mobile OS 130 and/or the graphics context of mobile OS 130.

Desktop OS user interaction space 2202 is displayed on a display within a user interaction space (e.g., secondary terminal environment 840) associated with desktop OS 160. Menu bar 2220 of desktop OS 160 includes menu items 2222, 2224, 2226, and/or 2228 associated with applications compiled for and loaded on desktop OS 160 (e.g., compiled for Hydroid/Linux and loaded within the execution environment of Hydroid OS). Menu bar 2220 also includes menu items 2234, 2236, 2237, and/or 2238 associated with applications compiled for and loaded on mobile OS 130 (e.g., compiled for Android and loaded within the Android execution environment). When the user selects one of menu items 2234, 2236, and/or 2238, the associated application is launched on mobile OS 130 and displayed within a console window of desktop OS 160, for example, within window 2216 of desktop OS user interaction space 2202. Menu item 2232 may be associated with the mobile OS graphics context such that if menu item 2232 is selected, the graphics context of the mobile OS is displayed within a console window of desktop OS 160.

Figure 23:
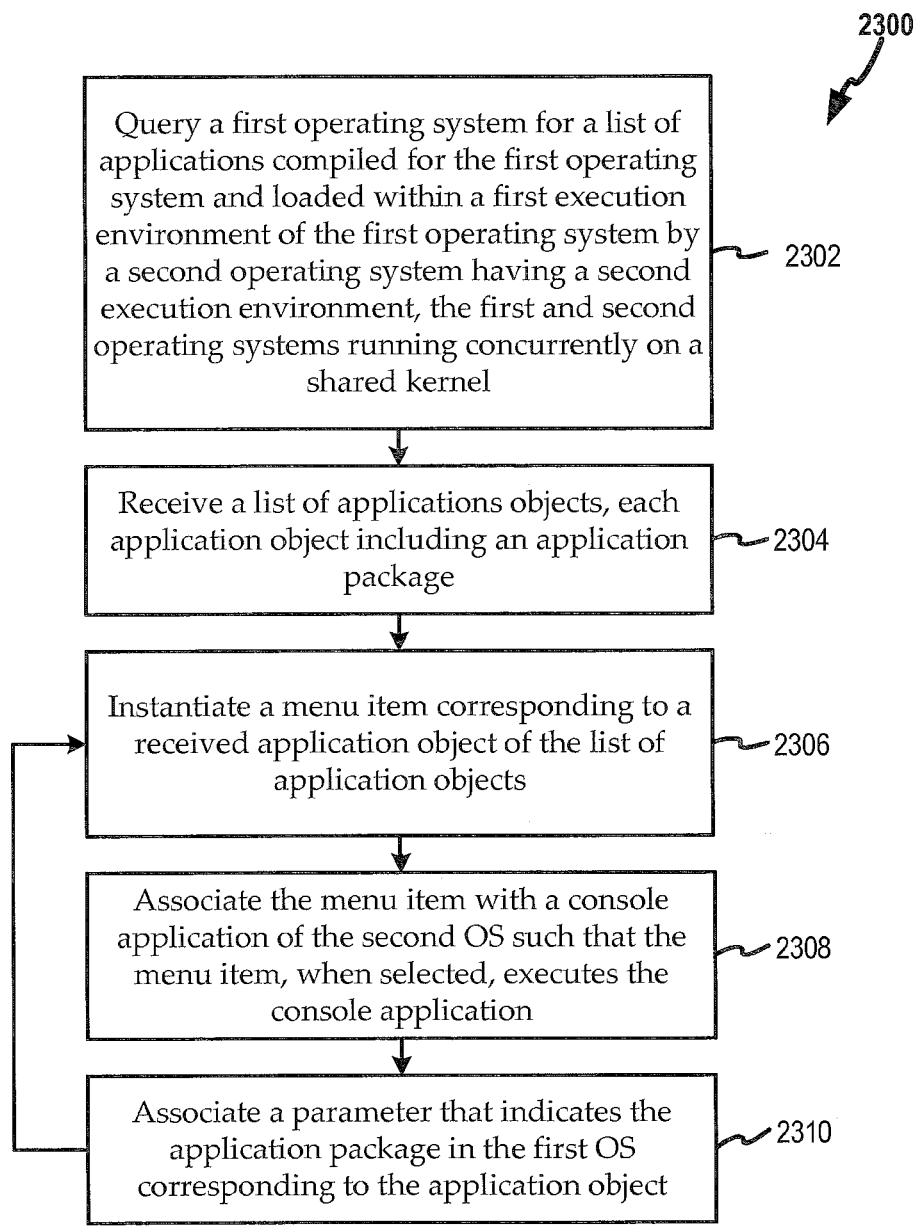
FIG. 23 illustrates a flow diagram of an illustrative method that may be employed to perform aspects of cross-environment redirection, according to various embodiments.

FIG. 23 illustrates process flow 2300 that may be employed to build menu bar 2220 of desktop OS 160. At step 2302 of process flow 2300, desktop OS 160 queries mobile OS 130 for a list of available applications. In one embodiment, a system service or launcher application of desktop OS 160 queries a service of mobile OS 130 for all launchable mobile OS application shortcuts. Mobile OS 130 responds with a list of applications that are available (i.e., launchable shortcuts for available mobile OS applications). The list of available applications may include all applications available on mobile OS 130 (all applications loaded and executable on mobile OS 130) or a subset of available mobile OS applications. For example, the list may include all applications that appear on the application menu screen(s) of the mobile OS GUI. At step 2304, desktop OS 160 receives the list of applications from mobile OS 130. The list of applications returned by mobile OS 130 includes application package names for each listed application, and may also include application names and icons for each listed application.

Desktop OS 160 creates the menu items in menu bar 2220 for each application of the list of applications by iterating over blocks 2306, 2308, and 2310. For each application, desktop OS 160 instantiates an icon for the application in menu bar 2220 at block 2306, associates the icon with a console application of desktop OS 160 at block 2308, and associates a parameter that indicates the package name of the application with the icon at block 2310. The console application runs on desktop OS 160 and displays graphics information for the application within desktop OS 160, using embodiments of cross-environment rendering described above. In this way, when a user selects the menu item, the console application is launched on desktop OS 160, and the package name of the application is passed to the console application.

Desktop OS 160 may display the menu items associated with applications of mobile OS 130 in a variety of ways. The menu items may be displayed in menu bar 2220, or a drop-down menu that appears when a menu item that indicates that mobile OS applications are available is selected. The menu items may be displayed using icons or only application names in menu bar 2220 or the drop-down menu. In one embodiment, desktop OS 160 displays a separate menu bar for mobile OS applications. In another embodiment, menu items associated with mobile OS applications appear within the desktop OS menu bar 2220 alongside or intermingled with menu items for desktop OS applications. Optionally, the mobile OS menu items may be in an area 2230 of menu bar 2220 set off by delimiter 2240 or otherwise identifiable as including mobile OS menu items. Menu bar 2220 may include a menu item for the active display of the mobile device itself, i.e., a menu item that the user can select to display the user interaction space of the mobile OS within a user environment of the desktop OS according to the methods of FIGS. 20 and/or 21. In one embodiment, the home screen application of the mobile OS is returned in the list of available applications and provided an associated menu item.

When the user selects a menu item associated with a mobile OS application, desktop OS 160 launches the console application associated with the menu item and passes the package name of the application to the console application. The console application displays a window within the desktop OS user interaction space 2202 (i.e., the console application displays within the graphics system of the desktop OS). The console application sends a request to mobile OS 130 to launch the application (i.e., requests mobile OS 130 to launch the application package name provided to the console application as an execution parameter) and display the graphics frame for the application through the console application. The application mayor may not be currently running on mobile OS 130. If the application is currently running on mobile OS 130, the display of the application may be moved from mobile OS 130 to the desktop OS user interaction space 2202 or displayed both on a display of the mobile device and user interaction space 2202 at the same time. Display of application graphics and user interaction support may be accomplished for the application using any of the cross-environment rendering and cross-environment user interface support techniques described above.

Figure 24:
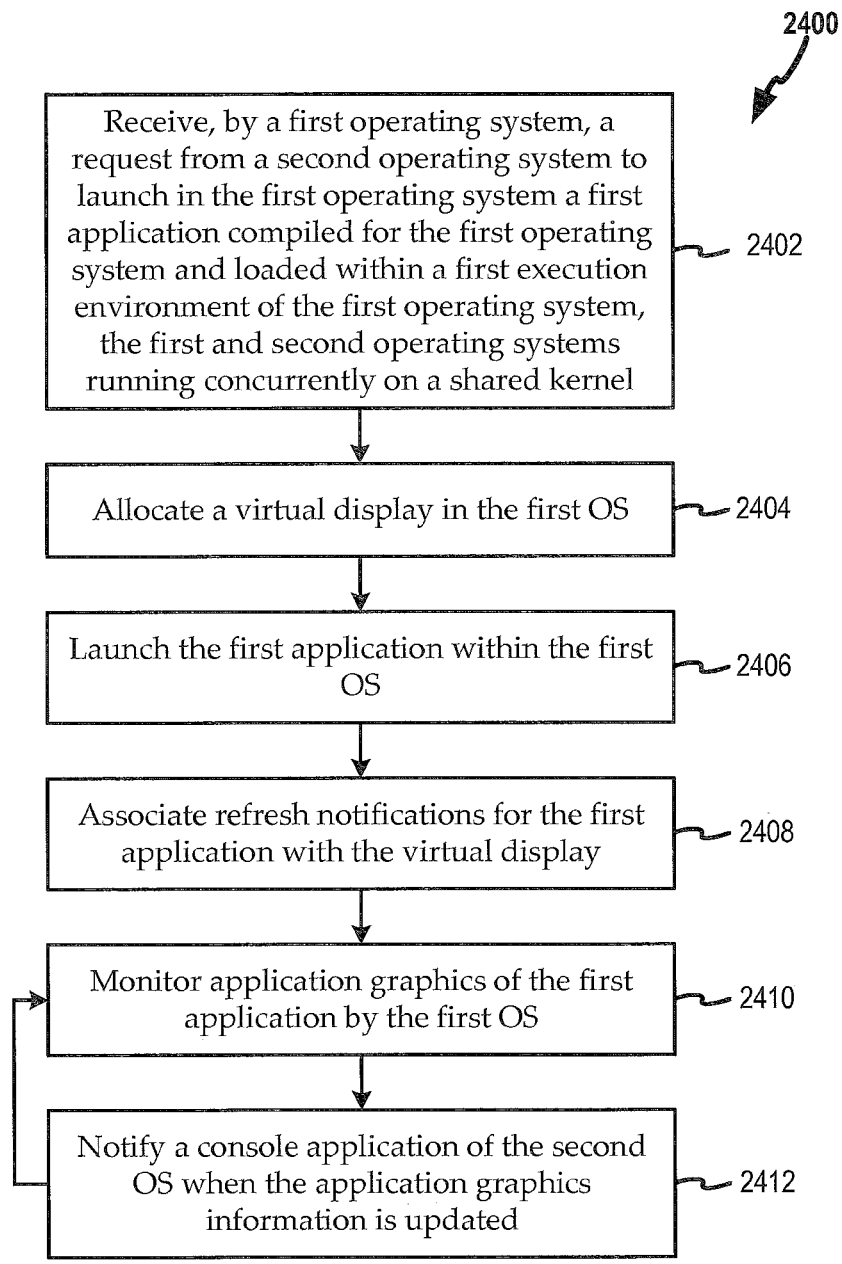
FIG. 24 illustrates a flow diagram of another illustrative method that may be employed to perform aspects of cross-environment redirection, according to various embodiments.

FIG. 24 illustrates process flow 2400 followed by mobile OS 130 to launch an application in response to the user selecting a menu item associated with a mobile OS application on menu bar 2220 of desktop OS GUI 880. Process flow 2400 begins at block 2402 when mobile OS 130 receives the request from desktop OS 160 to launch an application compiled for the mobile OS and loaded within the execution environment of the mobile OS for display on the desktop OS. At block 2404, the mobile OS allocates an unused virtual display ID. For example, the graphics system of the mobile OS may keep a list of virtual display ID's and allocate an unused virtual display ID to the process of the first application. At block 2406, the mobile OS launches the first application within the mobile OS (i.e., running on the mobile OS). At block 2408, mobile OS 130 associates refresh notifications for the first application with the virtual display. For example, the graphics server of the mobile OS may keep a list of applications and their associated virtual displays. At blocks 2410 and 2412, the mobile OS maintains graphics information for the first application by monitoring application graphics for the first application and notifying a console application of the desktop OS when application graphics information for the first application is updated. Blocks 2410 and 2412 may correspond to maintaining application graphics for cross-environment applications according to the methods of FIGS. 10, 12, 16 and/or 17.

The foregoing description has been presented for purposes of illustration and description. Furthermore, the description is not intended to limit embodiments of the invention to the form disclosed herein. While a number of exemplary aspects and embodiments have been discussed above, those of skill in the art will recognize certain variations, modifications, permutations, additions, and sub-combinations thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method comprising:
running a first operating system and a second operating system concurrently and independently on a shared kernel, wherein each first and second operating system makes system calls through the shared kernel without virtualized memory;
calculating, using the first operating system, updates to a set of surfaces of a first application compiled for and in active execution within the first operating system;
rendering, using the first operating system, the set of surfaces according to the updates to generate a graphics frame;
allocating anonymous shared memory comprising named memory blocks for the set of surfaces by a graphics server of the first operating system, the anonymous shared memory accessible by name through a file descriptor by all processes running on the first operating system and the second operating system and not accessible by name by other processes, the named memory blocks of the anonymous shared memory freed by the shared kernel, the shared kernel including an inter-process communications driver which passes the file descriptor to processes in the first operating system and the second operating system to allow communication between the first operating system and the second operating system to communicate across process boundaries;
storing the graphics frame in the anonymous shared memory location;
displaying the graphics frame to a first application display of the first application on a first display of a first computing environment using the first operating system;
passing a file descriptor indicating the anonymous shared memory location to a console application compiled for and in active execution within the second operating system; and
displaying the graphics frame from the shared memory location to a second application display of the first application on a second display of a second computing environment via the console application of the second operating system according to the file descriptor, such that the second application display is identical to the first application display, wherein the first display is associated with a mobile device and the second display is associated with a desktop computing system, wherein the first operating system and the second operating system execute on the mobile device, wherein the first computing environment is the mobile device and the second computing environment is the desktop computing system, wherein the mobile device and the desktop computing system are distinct computing devices;
wherein the first operating system is a mobile operating system and the second operating system is a desktop operating system;
wherein when the mobile device is connected to the desktop computing system, a user experiences the second application on the active second display of the desktop computing system through a desktop computing experience of the desktop computing system; and
wherein the mobile device is a mobile telephony device.

2. The method of claim 1, wherein a graphics server of the second operating system does not function with a drawing object instantiated by the first application.

3. The method of claim 1, wherein a graphics server of the first operating system is does not function with a graphics server of the second operating system.

4. The method of claim 1, wherein the mobile telephony device is a smartphone.

5. The method of claim 1, wherein a graphics server of the second operating system comprises a desktop graphics server.

6. The method of claim 1, further comprising mapping, by the console application, the file descriptor to the process space of the console application to generate a reference to the shared memory location.

7. The method of claim 6, further comprising accessing, by the console application, the graphics frame from the shared memory location via the reference to the shared memory location.

8. The method of claim 1, wherein the set of surfaces of the first application are rendered through a first context space of an extended rendering context of the first operating system.

9. The method of claim 1, wherein the console application is configured to, upon receipt of a first input event from an input device connected to the mobile computing device, generate a second input event based on the first input event, wherein the second input event from the console application is passed to a virtual input device, wherein the first operating system accesses and passes the second input event from the virtual input device to an application running in the first operating system associated with the virtual display.

10. A mobile computing device comprising:
a first application compiled for and in active execution within a first operating system;
a graphics frame for the first application;
a second operating system and the first operating system running concurrently and independently on a shared kernel, wherein each first and second operating system makes system calls through the shared kernel without virtualized memory;
anonymous shared memory comprising named memory blocks accessible by all processes running on the first operating system and the second operating system, the anonymous shared memory accessible by name through a file descriptor by all processes running on the first operating system and the second operating system and not accessible by name by other processes, the named memory blocks of the anonymous shared memory freed by the shared kernel, the shared kernel including an inter-process communications driver which allows processes in the first operating system and the second operating system to communicate with one another across process boundaries, the graphics frame for the first application rendered in the anonymous shared memory location by the first operating system;
a first application display of the first application displayed on a first display of a first computing environment using the first operating system; and
a console application running within the second operating system that displays the graphics frame to a second application display on a display of a second computing environment associated with the second operating system by accessing the anonymous shared memory location of the graphics frame through a file descriptor to the graphics frame passed by the first operating system, wherein the first display is associated with the mobile device and the second display is associated with a desktop computing system, wherein the first operating system and the second operating system execute on the mobile device, wherein the first computing environment is the mobile device and the second computing environment is the desktop computing system, wherein the mobile device and the desktop computing system are distinct computing devices;

wherein the first operating system is a mobile operating system and the second operating system is a desktop operating system;

wherein when the mobile device is connected to the desktop computing system, a user experiences the second application on the second active display of the desktop computing system through a desktop computing experience of the desktop computing system; and wherein the mobile device is a mobile telephony device.

11. The mobile computing device of claim 10, wherein a graphics server of the second operating system is a desktop graphics server and wherein the first application uses a graphics library of the first operating system that does not function with the desktop graphics server of the second operating system.

12. The mobile computing device of claim 10, wherein the shared memory location comprises a frame buffer of the first operating system.

13. The device of claim 10, wherein the console application is configured to, upon receipt of a first input event from an input device connected to the mobile computing device, generate a second input event based on the first input event, wherein the second input event from the console application is passed to a virtual input device, wherein the first operating system accesses and passes the second input event from the virtual input device to an application running in the first operating system associated with the virtual display.

14. A computing device including a non-transitory computer-readable medium storing instructions for a physical processor, the instructions, when executed, causing the processor to perform steps comprising:

running a first operating system and a second operating system concurrently and independently on a shared kernel, wherein each first and second operating system makes system calls through the shared kernel without virtualized memory;

calculating, using the first operating system, updates to a set of surfaces of a first application compiled for and in active execution within the first operating system;

rendering, using the first operating system, the set of surfaces according to the updates to generate a graphics frame;

allocating anonymous shared memory comprising named memory blocks for the set of surfaces by a graphics server of the first operating system, the anonymous shared memory accessible by name through a file descriptor by all processes running on the first operating system and the second operating system and not accessible by name by other processes, the named memory blocks of the anonymous shared memory freed by the shared kernel;

storing the graphics frame in the anonymous shared memory location;

displaying the graphics frame to a first application display of the first application on a first display of a first computing environment using the first operating system;

passing a file descriptor indicating the anonymous shared memory location to a console application compiled for and in active execution within the second operating system; and displaying the graphics frame from the anonymous shared memory location to a second application display of the first application on a second display of a second computing environment via the console application of the second operating system according to the file descriptor, such that the second application display is identical to the first application display, wherein the first display is associated with the mobile device and the second display is associated with a desktop computing system, wherein the first operating system and the second operating system execute on the mobile device, wherein the first computing environment is the mobile device and the second computing environment is the desktop computing system, wherein the mobile device and the desktop computing system are distinct computing devices;

wherein the first operating system is a mobile operating system and the second operating system is a desktop operating system;

wherein when the mobile device is connected to the desktop computing system, a user experiences the second application on the second active display of the desktop computing system through a desktop computing experience of the desktop computing system; and wherein the mobile device is a mobile telephony device.

15. The computing device of claim 14, wherein a graphics server of the second operating system is does not function with a drawing object instantiated by the first application.

16. The computing device of claim 14, wherein a graphics server of the first operating system is does not function with a graphics server of the second operating system.

17. The computing device of claim 14, wherein the mobile telephony device is a smartphone.

18. The computing device of claim 14, wherein the a graphics server of the second operating system comprises a desktop graphics server.

19. The computing device of claim 14, wherein the instructions, when executed, cause the processor to further perform steps comprising mapping, by the console application, the file descriptor to the process space of the console application to generate a reference to the shared memory location.

20. The computing device of claim 19, wherein the instructions, when executed, cause the processor to further perform steps comprising accessing, by the console application, the graphics frame from the shared memory location via the reference to the shared memory location.

21. The computing device of claim 14, wherein the set of surfaces of the first application are rendered through a first context space of an extended rendering context of the first operating system.

22. The computing device of claim 14, wherein the shared kernel includes an inter-process communications driver which allows processes in the first operating system and the second operating system to communicate with one another.

* * * * *